United States Patent
Suzuki et al.

(10) Patent No.: US 8,810,167 B2
(45) Date of Patent: Aug. 19, 2014

(54) METHOD AND CIRCUIT FOR DRIVING BRUSHLESS MOTOR AND METHOD AND CIRCUIT FOR DETECTING ROTATIONAL POSITION OF BRUSHLESS MOTOR

(75) Inventors: Hidetoshi Suzuki, Hamamatsu (JP); Makoto Morisaki, Kosai (JP)

(73) Assignee: Asmo Co., Ltd., Kosai-shi, Shizuoka-ken (JP)

( * ) Notice: Subject to any disclaimer, the term of this patent is extended or adjusted under 35 U.S.C. 154(b) by 430 days.

(21) Appl. No.: 13/214,832

(22) Filed: Aug. 22, 2011

(65) Prior Publication Data

US 2012/0049781 A1    Mar. 1, 2012

(30) Foreign Application Priority Data

Aug. 24, 2010 (JP) .................. 2010-187602
Jul. 20, 2011 (JP) .................. 2011-159290

(51) Int. Cl.
*H02P 6/00* (2006.01)

(52) U.S. Cl.
USPC .................. 318/400.01; 318/400.02; 318/721; 318/801

(58) Field of Classification Search
CPC ............. H02P 6/00; H02P 6/14; H02P 27/04; H02P 27/06

USPC ............ 318/400.01, 400.02, 400.09, 400.14, 318/400.15, 400.23, 721, 799, 432, 801; 310/179, 257

See application file for complete search history.

(56) References Cited

U.S. PATENT DOCUMENTS

| | | | |
|---|---|---|---|
| 2007/0182266 A1* | 8/2007 | Nashiki et al. | 310/179 |
| 2008/0197739 A1 | 8/2008 | Nashiki | |
| 2009/0021089 A1 | 1/2009 | Nashiki | |
| 2009/0134734 A1* | 5/2009 | Nashiki | 310/162 |
| 2009/0236930 A1* | 9/2009 | Nashiki | 310/257 |

FOREIGN PATENT DOCUMENTS

| | | |
|---|---|---|
| JP | 2007215305 A | 8/2007 |
| WO | WO2007010934 A1 | 1/2007 |

* cited by examiner

*Primary Examiner* — Antony M Paul
(74) *Attorney, Agent, or Firm* — Faegre Baker Daniels LLP

(57) ABSTRACT

A method for driving a brushless motor including a first coil and a second coil for two phases but does not include a coil for one of three phases. A three-phase inverter circuit is connected to the first coil and the second coil. Currents having a phase difference corresponding to an electrical angle of 60 degrees are applied to the first coil and the second coil to generate a circular rotating magnetic field.

23 Claims, 17 Drawing Sheets

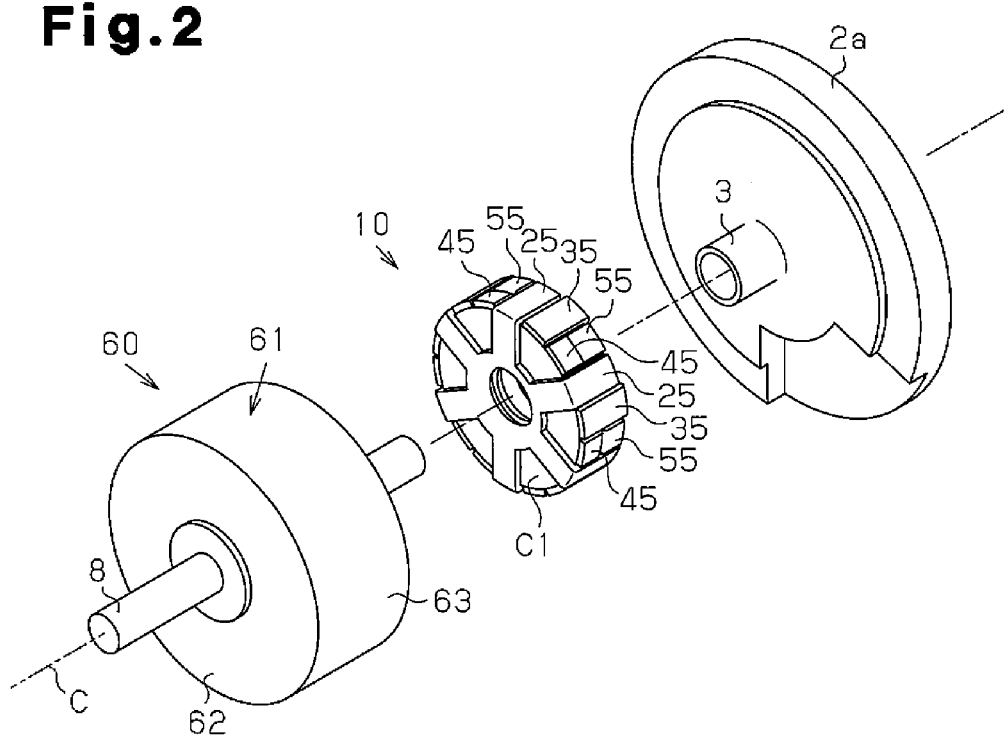
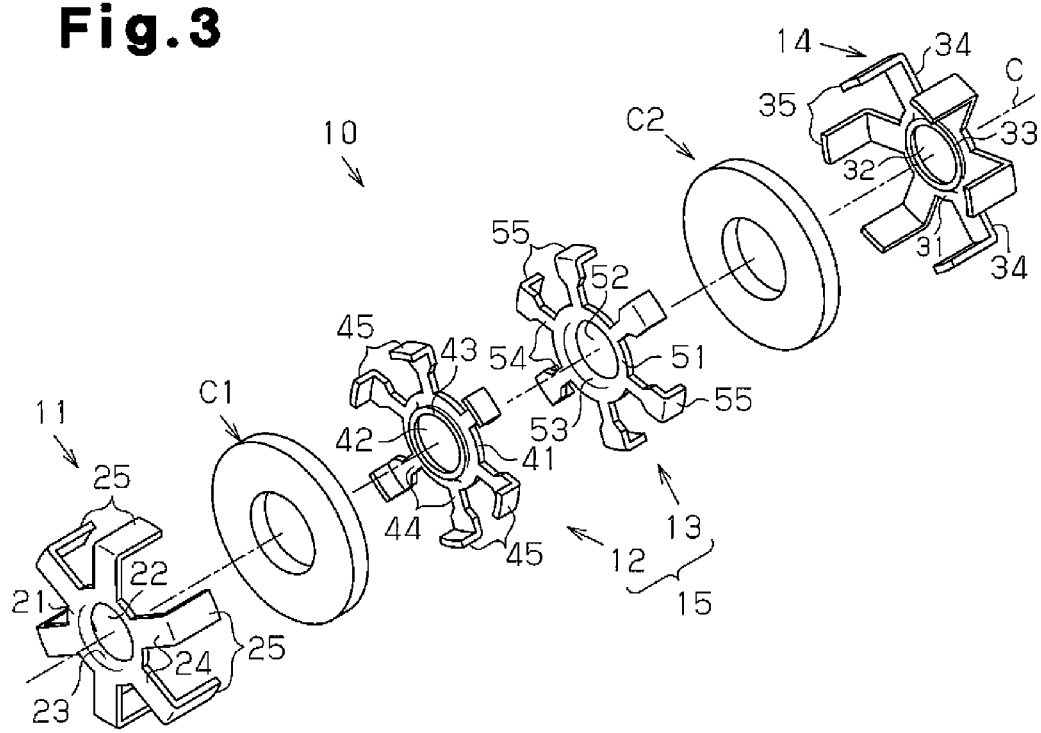

METHOD AND CIRCUIT FOR DRIVING BRUSHLESS MOTOR AND METHOD AND CIRCUIT FOR DETECTING ROTATIONAL POSITION OF BRUSHLESS MOTOR

BACKGROUND OF THE INVENTION

The present invention relates to a method and circuit for driving a brushless motor, and a method and circuit for detecting the rotational position of a brushless motor.

Brushless motors are highly efficient motors with a simple structure that have recently attracted attention. For example, a claw pole brushless motor includes a laminate of U-phase, W-phase, and W-phase annular stator members, and U-phase, V-phase, and W-phase coils wound between the stator members. The coils are connected by delta connection or by Y-connection to form the three-phase claw pole brushless motor.

Each of the U-phase, V-phase, and W-phase stator members includes a plurality of claw poles arranged to face a rotor of the motor. The claw poles of the different phases are arranged in a predetermined order in the circumferential direction. A three-phase inverter circuit controls equilibrium currents for three phases that are supplied through the three-phase coils. With the controlled equilibrium currents flowing through the coils, the claw poles of the different phases each generate a rotating magnetic field, which drives and rotates the rotor.

In recent years, brushless motors that have a simpler structure, a smaller size, and cost less have been proposed (refer to, for example, Japanese Laid-Open Patent Publication No. 2007-215305). Such a brushless motor may eliminate one of the U-phase coil, V-phase coil, and W-phase coil and include only two phases of coils. The simplified motor structure eliminating one phase can improve productivity and reduce the size and cost of the motor.

A brushless motor eliminating one phase and including only two phases of coils may use four power elements and two direct current power supplies to control the currents supplied through the two phases of coils and rotate the rotor (refer to, for example, WO 2007/010934).

However, when the equilibrium currents for three phases are supplied from the three-phase inverter circuit to the terminals of the two phases of coils in the brushless motor described in Japanese Laid-Open Patent Publication No. 2007-215305, the different phases of claw poles will generate a rotating magnetic field that is not circular but elliptical in which the magnitude of the field changes depending on the electrical angle.

In this manner, the brushless motor eliminating one phase and including only two phases of coils fails to generate a circular rotating magnetic filed. As a result, the brushless motor cannot avoid a secondary torque ripple generated in accordance with the electrical angle of the motor and thus cannot avoid noise and vibration generated by such a secondary torque ripple.

Moreover, the brushless motor described in WO 2007/010934 requires two direct current power supplies to achieve the simplified structure including only two of the three phases of coils. The need for the two DC power supplies complicates the circuit structure of the motor and makes the motor unpractical.

SUMMARY OF THE INVENTION

It is an object of the present invention to provide a method and a circuit for driving a brushless motor including two of three phases of coils in a manner to generate a circular rotating magnetic field using a three-phase inverter circuit, and a method and a circuit for detecting the rotational position of such a brushless motor.

To achieve the above object, one aspect of the present invention provides a method for driving a brushless motor including a first coil and a second coil for two phases. The motor does not include a coil for one of three phases. The method connects a three-phase inverter circuit to the first coil and the second coil. Further, the method applies currents having a phase difference corresponding to an electrical angle of 60 degrees to the first coil and the second coil to generate a circular rotating magnetic field.

In the above configuration, a circular rotating magnetic field can be generated in a stator including the first coil and second coil for two phases but not a coil for one of three phases. As a result, in the brushless motor that includes coils for two phases, torque ripple corresponding to each electrical angle is eliminated. This prevents the generation of noise and vibration in the motor that would be caused by torque ripple.

Preferably, the brushless motor is a claw pole three-phase brushless motor.

In the above configuration, a circular rotating magnetic field can be generated in a stator including the first coil and second coil for two phases but not a coil for one of three phases.

Preferably, the first coil and the second coil are formed by eliminating one of the coils for three phases that are delta-connected.

In the above configuration, a circular rotating magnetic field can be generated in a stator including the first coil and the second coil but does not include one of the coils for three phases that are delta-connected.

Preferably, 180-degree square-wave voltages having a phase difference of 120 degrees are applied to a common terminal that connects one end of the first coil and one end of the second coil, a first terminal of the first coil that is the other end of the first coil, and a second terminal of the second coil that is the other end of the second coil. As a result, currents flow through the first coil and the second coil at a phase difference corresponding to an electrical angle of 60 degrees.

In the above configuration, 180-degree square-wave voltages having a phase difference of 120 degrees are applied to the three terminals of the first coil and the second coil. As a result, currents flow through the first coil and the second coil at a phase difference corresponding to an electrical angle of 60 degrees. Thus, a circular rotating magnetic field can be generated in a stator.

Preferably, sine wave voltages having a phase difference of 120 degrees are applied to a common terminal that connects one end of the first coil and one end of the second coil, a first terminal of the first coil that is the other end of the first coil, and a second terminal of the second coil that is the other end of the second coil. As a result, currents flow through the first coil and the second coil at a phase difference corresponding to an electrical angle of 60 degrees.

In the above configuration, sine wave voltages having a phase difference of 120 degrees are applied to the three terminals of the first coil and the second coil, and currents for two phases flow through the first coil and the second coil at a phase difference corresponding to an electrical angle of 60 degrees. Thus, a circular rotating magnetic field can be generated in a stator.

Preferably, a sine wave voltage is constantly applied to the common terminal at a level that is one half the maximum value of the sine wave voltages applied to the first terminal and the second terminal. Further, sine wave voltages having a phase difference corresponding to an electrical angle of 60 degrees to the first terminal and the second terminal are applied so that two phases of currents having a phase difference corresponding to an electrical angle of 60 degrees flow through the first coil and the second coil.

In the above configuration, sine wave voltages having a phase difference of 120 degrees are applied to three terminals, and currents for two phases flow through the first coil and the second coil at a phase difference corresponding to an electrical angle of 60 degrees. Thus, a circular rotating magnetic field can be generated in a stator.

Preferably, alternating currents are calculated for three phases respectively flowing through three hypothetic terminals when the brushless motor that does not include a coil is converted to an equivalence of a three-phase brushless motor. From the alternating currents for three phases, a d-axis actual current value and a q-axis actual current value are obtained in a two-axis rotation coordinate system that rotates in synchronization with frequencies of terminal voltages applied to the first coil and the second coil. A deviation between the d-axis actual current value and a d-axis current command value and a deviation between the q-axis actual current value and a q-axis current command value are obtained. A d-axis voltage command value and a q-axis voltage command value are calculated from the two deviations so that currents flow in accordance with the d-axis current command value and the q-axis current command value. Voltages are applied to the common terminal, first terminal, and second terminal in accordance with the d-axis voltage command value and the q-axis voltage command value so that currents of two phases having a phase difference corresponding to an electrical angle of 60 degrees flow through the first coil and the second coil.

In the above configuration, currents flowing through the three terminals of the first coil and the second coil are detected. Thus, vector control can be executed so that sine wave voltages having a phase difference of 120 degrees are applied to three terminals, and currents for two phases flow through the first coil and the second coil at a phase difference corresponding to an electrical angle of 60 degrees. Thus, a circular rotating magnetic field can be generated in a stator.

Preferably, a first-phase current flowing through a first terminal that is one end of the first coil, a second-phase current flowing through a second terminal that is one end of the second coil, and a third-phase current flowing through a common terminal connecting the other end of the first coil and the other end of the second coil are detected. The alternating currents for three phases respectively flowing through the three hypothetic terminals are calculated based on the first-phase current, the second-phase current, and the third-phase current.

In the above configuration, currents flowing through the three terminals of the first coil and the second coil are detected. Thus, vector control can be executed so that sine wave voltages having a phase difference of 120 degrees are applied to three terminals, and currents for two phases flow through the first coil and the second coil at a phase difference corresponding to an electrical angle of 60 degrees. Thus, a circular rotating magnetic field can be generated in a stator.

Preferably, when a common terminal connects one end of the first coil and one end of the second coil, a first-phase current flowing through a first terminal of the first coil that is the other end of the first coil and a second-phase current flowing through a second terminal of the second coil that is the other end of the second coil are detected. Further, the alternating currents for three phases respectively flowing through the three hypothetic terminals are calculated based on the first-phase current and the second-phase current.

In the above configuration, the alternating currents for three phases respectively flowing through the three hypothetic terminals can be calculated by detecting the first-phase current and the second-phase current.

A second aspect of the present invention provides a method for driving a brushless motor in which three phases of coils are connected to a three-phase inverter circuit and supplied with three phases of equilibrium currents and the one of the three phases of coils is disconnected. The method applies currents of two phases having a phase difference corresponding to an electrical angle of 60 degrees to the remaining two phases of coils through the three-phase inverter circuit to generate a circular rotating magnetic field.

In the above configuration, a circular rotating magnetic field can be generated in a stator even when one of three phases of coils is disconnected. This eliminates torque ripple and prevents the generation of noise and vibration that would be caused by torque ripple.

Preferably, the brushless motor is a three-phase brushless motor in which the three phases of coils are in a delta connection or Y connection.

In the above configuration, a circular rotating magnetic field can be generated in a stator even when one of three phases of coils is disconnected in a three-phase brushless motor.

Preferably, when one of the three phases of coils in the delta connection is disconnected, 180-degree square-wave voltages having a phase difference of 120 degrees to three terminals of the three phases of coils so that currents having a phase difference corresponding to an electrical angle of 60 degrees flow to the remaining two phases of coils.

In the above configuration, a circular rotating magnetic field can be generated in a stator even when one of three phases of coils in the delta connection is disconnected.

Preferably, when one of the three phases of coils in the delta connection is disconnected, sine wave voltages having a phase difference of 120 degrees are applied to a common terminal connecting the two phases of coils that are not disconnected, a terminal connecting the disconnected coil and one of the two phases of coils that are not disconnected, and a terminal connecting the disconnected coil and the other one of the two phases of coils that are not disconnected. As a result, current having a phase difference corresponding to an electrical angle of 60 degrees flows through the two phases of coils that are not disconnected.

In the above configuration, a circular rotating magnetic field can be generated in a stator even when one of the three phases of coils in the delta connection is disconnected.

Preferably, a sine wave voltage is constantly applied to the common terminal at a level that is one half the maximum value of the sine wave voltages applied to the remaining two terminals when one of the three phases of coils in the delta connection is disconnected. Further, sine wave voltages having a phase difference corresponding to an electrical angle of 60 degrees are applied to the remaining two terminals so that currents having a phase difference corresponding to an electrical angle of 60 degrees flow through the coils that are not disconnected.

In the above configuration, a circular rotating magnetic field can be generated in a stator even when one of the three phases of coils in the delta connection is disconnected.

Preferably, the brushless motor is a three-phase brushless motor including three phases of coils in a delta connection. Alternating currents are calculated for three phases respectively flowing through three terminals of the three phases of coils when one of the three phases of coils in the delta connection is disconnected. From the alternating currents for three phases, a d-axis actual current value and a q-axis actual current value are obtained in a two-axis rotation coordinate system that rotates in synchronization with frequencies of terminal voltages applied to a first coil and a second coil that are not disconnected. A deviation between the d-axis actual current value and a d-axis current command value and a deviation between the q-axis actual current value and a q-axis current command value are obtained. A d-axis voltage command value and a q-axis voltage command value are calculated from the two deviations so that currents flow in accordance with the d-axis current command value and the q-axis current command value. Voltages are applied to the first coil and the second coil based on the d-axis voltage command value and the q-axis voltage command value so that two phases of currents having a phase difference corresponding to an electrical angle of 60 degrees flow.

In the above configuration, currents flowing through three terminals arranged in the first coil and second coil for two phases that are not disconnected are detected. As a result, vector control can be executed so that sine wave voltages having a phase difference of 120 degrees are applied to three terminals, and currents for two phases flow at a phase difference corresponding to an electrical angle of 60 degrees. Thus, a circular rotating magnetic field can be generated in a stator.

Preferably, a first-phase current flowing through a first terminal that is one end of the first coil, a second-phase current flowing through a second terminal that is one end of the second coil, and a third-phase current flowing through a common terminal connecting the other end of the first coil and the other end of the second coil are detected. Further, the alternating currents for three phases respectively flowing through the three terminals of the three phases of coils based on the first-phase current, the second-phase current, and the third-phase current are calculated.

In the above configuration, currents flowing through three terminals arranged in the first coil and second coil for two phases that are not disconnected are detected. As a result, vector control can be executed so that sine wave voltages having a phase difference of 120 degrees are applied to three terminals, and currents for two phases flow at a phase difference corresponding to an electrical angle of 60 degrees. Thus, a circular rotating magnetic field can be generated in a stator.

Preferably, when a common terminal connects one end of the first coil and one end of the second coil, a first-phase current flowing through a first terminal that is the other end of the first coil and a second-phase current flowing through a second terminal that is the other end of the second coil are detected. Based on the first-phase current and the second-phase current, the alternating currents are calculated for three phases respectively flowing through three hypothetic terminals when the brushless motor in which a coil for one phase is disconnected is converted to an equivalence of a three-phase brushless motor in which a coil for one phase is not disconnected.

In the above configuration, the alternating currents for three phases respectively flowing through the three hypothetic terminals can be calculated by detecting the first-phase current and the second-phase current.

Preferably, when one of the three phases of coils in the Y connection is disconnected, 180-degree square wave voltages having a phase difference of 120 degrees are applied to a neutral point terminal and to terminals of the two phases of coils that are not disconnected so that currents having a phase difference corresponding to an electrical angle of 60 degrees flow through the coils that are not disconnected.

In the above configuration, 180-degree square wave voltages having a phase difference of 120 degrees are applied to three terminals of the two phases of coils so that currents having a phase difference corresponding to an electrical angle of 60 degrees flow. As a result, a circular rotating magnetic field can be generated in a stator even when one of the three phases of coils in the Y connection is disconnected.

Preferably, when one of the three phases of coils in the Y connection is disconnected, sine wave voltages having a phase difference of 120 degrees are applied to a neutral point terminal and to terminals of the two phases of coils that are not disconnected. As a result, currents having a phase difference corresponding to an electrical angle of 60 degrees flow through the coils that are not disconnected.

In the above configuration, a circular rotating magnetic field can be generated in a stator even when one of the three phases of coils in the Y connection is disconnected.

Preferably, when one of the three phases of coils in the Y connection is disconnected, a sine wave voltage is constantly applied to the neutral point terminal at a level that is one half the maximum value of the sine wave voltages applied to the terminals of the two phases of coils that are not disconnected. Further, sine wave voltages having a phase difference corresponding to an electrical angle of 60 degrees are applied to the two phases of coils that are not disconnected. As a result, currents having a phase difference corresponding to an electrical angle of 60 degrees flow through the terminals of the two phases of coils that are not disconnected.

In the above configuration, a circular rotating magnetic field can be generated in a stator even when one of the three phases of coils in the Y connection is disconnected.

Preferably, the brushless motor is a three-phase brushless motor including three phases of coils in the Y connection. When one of the three phases of coils in the Y connection is disconnected, alternating currents are calculated for three phases respectively flowing through a neutral point terminal and terminals of the two phases of coils that are not disconnected. From the alternating currents for three phases, a d-axis actual current value and a q-axis actual current value are obtained in a two-axis rotation coordinate system that rotates in synchronization with frequencies of terminal voltages applied to the two phases of coils that are not disconnected. A deviation between the d-axis actual current value and a d-axis current command value and a deviation between the q-axis actual current value and a q-axis current command value are obtained. From the two deviations, a d-axis voltage command value and a q-axis voltage command value are calculated so that currents flow in accordance with the d-axis current voltage command and the q-axis current command value. Voltages are applied to the terminals of the two phases of coils that are not disconnected in accordance with the d-axis voltage command value and the q-axis voltage command value. As a result, currents having a phase difference corresponding to an electrical angle of 60 degrees flow to the two phases of coils that are not disconnected.

In the above configuration, currents flowing through flowing through the neutral point terminal and the terminals of the two phases of coils that are not disconnected are detected. As a result, vector control can be executed so that sine wave voltages having a phase difference of 120 degrees are applied to three terminals, and currents for two phases flow at a phase difference corresponding to an electrical angle of 60 degrees. Thus, a circular rotating magnetic field can be generated in a stator.

Preferably, a first-phase current, a second-phase current, and a third-phase current flowing respectively through the neutral point terminal and the terminals of the two phases of coils that are not disconnected are detected. The alternating currents for three phases flowing through each of the terminals are calculated based on the first-phase current, the second-phase current, and the third-phase current.

In the above configuration, currents flowing through flowing through the terminals of the two phases of coils that are not disconnected and the neutral point terminal arranged at a neutral point are detected. As a result, vector control can be executed so that sine wave voltages having a phase difference of 120 degrees are applied to three terminals, and currents for two phases flow at a phase difference corresponding to an electrical angle of 60 degrees. Thus, a circular rotating magnetic field can be generated in a stator.

Preferably, a first-phase current flowing through a terminal of one of the two phases of coils that are not disconnected and a second-phase current flowing through a terminal of the other one of the two phases of coils that are not disconnected are detected. Further, alternating currents are calculated for three phases respectively flowing through three hypothetic terminals when the brushless motor in which a coil for one phase is disconnected is converted to an equivalence of a three-phase brushless motor including no disconnected coils based on the first-phase current and the second-phase current.

In the above configuration, the alternating currents for three phases respectively flowing through two terminals arranged in the coils for two phases that are not disconnected.

A third aspect of the present invention provides a circuit for driving a brushless motor including a first coil and a second coil for two phases. The motor does not include a coil for one of three phases. The circuit includes a three-phase inverter circuit and a control circuit. The three-phase inverter circuit is connected to a common terminal connecting one end of the first coil and one end of the second coil, a first terminal that is the other end of the first coil, and a second terminal that is the other end of the second coil. The three-phase inverter circuit connects the common terminal, the first terminal, and the second terminal with a phase difference of 120 degrees to a positive terminal of a direct current power supply during a period corresponding to 180 degrees and continuously or intermittently connects the common terminal, the first terminal, and the second terminal with a phase difference of 120 degrees to a negative terminal of the direct current power supply during a period corresponding to the remaining 180 degrees. This energizes the first coil and the second coil and supplies currents having a phase difference corresponding to an electrical angle of 60 degrees to the first coil and the second coil. The control circuit generates a control signal for controlling the three-phase inverter circuit and outputs the control signal to the three-phase inverter circuit.

In the above configuration, a circular rotating magnetic field can be generated in a stator including a first coil and a second coil for two phases but not a coil for one of three phases. This eliminates torque ripple corresponding to each electrical angle and prevents the generation of noise and vibration in the motor that would be caused by torque ripple.

A fourth aspect of the present invention is a method for detecting a rotational position of a brushless motor including a first coil and a second coil for two phases. The motor does not include a coil for one of three phases. A three-phase inverter circuit is connected to a common terminal connecting one end of the first coil and one end of the second coil, a first terminal that is the other end of the first coil, and a second terminal that is the other end of the second coil. The common terminal, the first terminal, and the second terminal are connected with a phase difference of 120 degrees to a positive terminal of a direct current power supply during a period corresponding to 180 degrees and continuously or intermittently connecting the common terminal, the first terminal, and the second terminal with a phase difference of 120 degrees to a negative terminal of the direct current power supply during a period corresponding to the remaining 180 degrees to energize the common terminal, the first terminal and the second terminal. This supplies currents having a phase difference corresponding to an electrical angle of 60 degrees to the first coil and the second coil. During a period in which the coils are energized so that a potential at one of the first terminal and the second terminal is the same as the common terminal, the one of the first terminal and the second terminal that has the same potential as the common terminal is released. An electrical angle is estimated based on a change in the potential at the released terminal.

In the above configuration, in a brushless motor that includes a first coil and a second coil for two phases but not a coil for one of three phases, the rotational position of the motor can be detected from the potential difference between the common terminal and either one of the first terminal and second terminal.

Preferably, during a period in which the coils are energized so that potentials at the first terminal and the second terminal differ from that at the common terminal, the electrical angle based on an energizing timing estimated in another period in which the coils are energized.

In the above configuration, during a period in which the coils are energized so that potentials at the first terminal and the second terminal differ from that at the common terminal, the rotational position of the motor can be detected without using the potential difference between the common terminal and either one of the first terminal and the second terminal.

A fifth aspect of the present invention is a circuit for detecting a rotational position of a brushless motor including a first coil and a second coil for two phases. The brushless motor does not include a coil for one of three phases. The brushless motor includes a common terminal connecting one end of the first coil and one end of the second coil, a first terminal that is the other end of the first coil, a second terminal that is the other end of the second coil, and a three-phase inverter circuit connected to the common terminal, the first terminal, and the second terminal. The three-phase inverter circuit connects the common terminal, the first terminal, and the second terminal with a phase difference of 120 degrees to a positive terminal of a direct current power supply during a period corresponding to 180 degrees and continuously or intermittently connects the common terminal, the first terminal, and the second terminal with a phase difference of 120 degrees to a negative terminal of the direct current power supply during a period corresponding to the remaining 180 degrees. This energizes the common terminal, the first terminal and the second terminal and supplies currents having a phase difference corresponding to an electrical angle of 60 degrees to the first coil and the second coil. The circuit for detecting a rotational position of a brushless motor includes a control circuit, a potential difference detection circuit, and an estimation circuit. The control circuit outputs a control signal for releasing, during a period in which the coils are energized so that a potential at one of the first terminal and the second terminal is the same as the common terminal, the one of the first terminal and the second terminal that has the same potential as the common terminal to the three-phase inverter circuit. The potential difference detection circuit detects a potential difference between the first terminal and the common terminal or a potential difference between the second terminal and the common terminal when the first terminal or the second terminal is released. The estimation circuit estimates an electrical angle of a rotor when the potential difference detected by the potential difference detection circuit reaches a predetermined potential difference.

In the above configuration, in a brushless motor that includes a first coil and a second coil for two phases but not a coil for one of three phases, the rotational position of the motor can be detected from the potential difference between the common terminal and either one of the first terminal and second terminal.

Preferably, a timer circuit that is further included measures time from when the first terminal or the second terminal is released to when the potential difference detection circuit detects the predetermined potential difference. The estimation circuit estimates the electrical angle of the rotor based on the time measured by the timer circuit during a period in which the coils are energized with the potentials at the first terminal and the second terminal differing from that at the common terminal.

In the above configuration, the rotational angle of the motor can be detected without using the potential difference between the common terminal and either one of the first terminal and the second terminal even during a period in which the coils are energized with the potentials at the first terminal and the second terminal differing from that at the common terminal.

BRIEF DESCRIPTION OF THE DRAWINGS

The invention, together with objects and advantages thereof, may best be understood by reference to the following description of the presently preferred embodiments together with the accompanying drawings in which:

FIG. 2 is an exploded perspective view showing the essential part of the motor of FIG. 1A;

FIG. 3 is an exploded perspective view showing the stator of FIG. 2;

DETAILED DESCRIPTION OF THE PREFERRED EMBODIMENTS

First Embodiment

A claw pole three-phase brushless motor according to a first embodiment of the present invention will now be described with reference to the drawings.

Figure 1A:
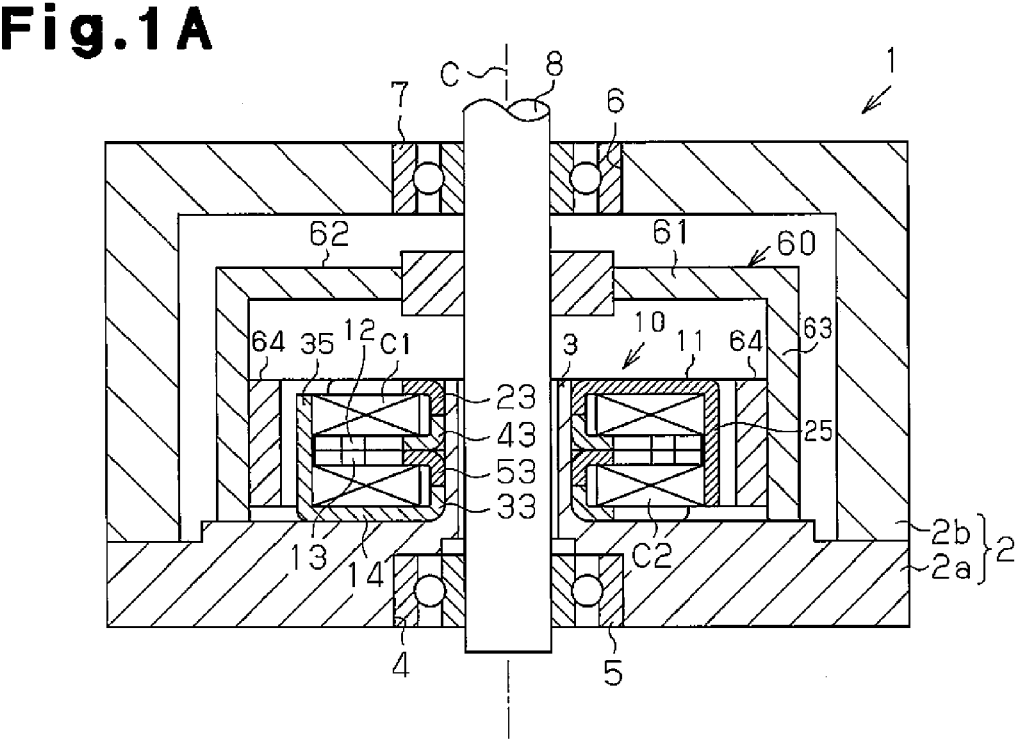
FIGS. 1A and 1B are cross-sectional views of a claw pole three-phase brushless motor according to a first embodiment of the present invention.
Figure 1B:
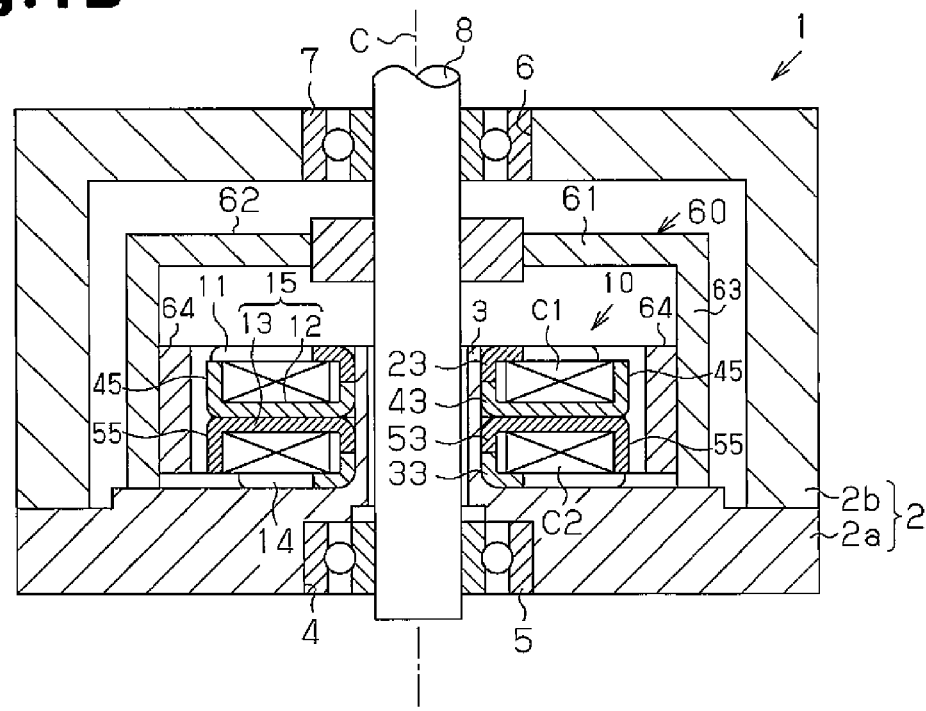

FIGS. 1A and 1B are cross-sectional views showing a schematic structure of a motor 1 according to the first embodiment.

The motor 1 includes a motor housing 2, which includes a disc-shaped base housing 2a and an annular cover housing 2b. The cover housing 2b has a lid and covers one side of the base housing 2a. The motor 1 further includes a cylindrical boss 3 formed in the center of the base housing 2a. A through-hole 4 is formed at the center of the base housing 2a at which the boss 3 is formed. A bearing 5 is fixed in the through-hole 4. A through-hole 6 is formed at the center of the lid of the cover housing 2b. A bearing 7 is fixed in the through-hole 6. The bearings 5 and 7 support a rotation shaft 8, which extends through the motor housing 2, in a manner that the rotation shaft 8 is rotatable.

A stator 10, which is shown in FIG. 2, is fixed to the circumferential surface of the boss 3. As shown in FIG. 3, the stator 10 includes a U-phase core 11, a first V-phase core 12, a second V-phase core 13, and a W-phase core 14. The W-phase core 14, the second V-phase core 13, the first V-phase core 12, and the U-phase core 11 are set on the boss 3 in the stated order. The stator 10 further includes a first coil C1 and a second coil C2. The first coil C1 is arranged between the first V-phase core 12 and the U-phase core 11. The second coil C2 is arranged between the second V-phase core 13 and the W-phase core 14.

As shown in FIG. 3, the U-phase core 11 has a substrate 21, which formed by a circular plate. The substrate 21 has a through-hole 22 at its center that extends through the boss 3. A flange 23 is formed on the rim of the through-hole 22. The flange 23 is cylindrical and extends toward the base housing 2a. A plurality of (six in the present embodiment) teeth 24 extending outward in the radial direction are formed on the circumferential surface of the substrate 21 at equal angular intervals of 60 degrees. Each tooth 24 includes a pole 25 extending from its distal end. The pole 25 bends in an L-shape and extends toward the base housing 2a in a direction parallel to a central axis C of the rotation shaft 8.

The W-phase core 14 has a substrate 31, which is formed by a circular plate. The substrate 31 has a through-hole 32 at its center that extends through the boss 3. A flange 33 is formed on the rim of the through-hole 32. The flange 33 is cylindrical and extends away from the base housing 2a. A plurality of (six in the present embodiment) teeth 34 extending outward in the radial direction are formed on the circumferential surface of the substrate 31 at equal angular intervals of 60 degrees. Each tooth 34 includes a pole 35 extending from its distal end. The pole 35 bends in an L-shape and extends away from the base housing 2a in a direction parallel to the central axis C of the rotation shaft 8.

The W-phase core 14 and the U-phase core 11 having the same shape are fixed to the boss 3 at different orientations. This enables the W-phase core 14 to be used as the U-phase core 11.

The first V-phase core 12 has a substrate 41, which is formed by a circular plate. The substrate 41 has a through-hole 42 at its center that extends through the boss 3. A flange 43 is formed on the rim of the through-hole 42. The flange 43 is cylindrical and extends away from the base housing 2a. A plurality of (six in the present embodiment) teeth 44 extending outward in the radial direction are formed on the circumferential surface of the substrate 41 at equal angular intervals of 60 degrees. Each tooth 44 includes a pole 45 extending from its distal end. The pole 45 bends in an L-shape and extends away from the base housing 2a in a direction parallel to the central axis C of the rotation shaft 8. The length of the pole 45 of each tooth 44 bent and extending in the direction of the central axis C is half the length of the pole 45 included in the U-phase core 11 (or the W-phase core 14).

The second V-phase core 13 has a substrate 51, which is formed by a circular plate. The substrate 51 has a through-hole 52 at its center that extends through the boss 3. A flange 53 is formed on the rim of the through-hole 52. The flange 53 is cylindrical and extends toward the base housing 2a. A plurality of (six in the present embodiment) teeth 54 extending outward in the radial direction are formed on the circumferential surface of the substrate 51 at equal angular intervals of 60 degrees. Each tooth 54 includes a pole 55 extending from its distal end. The pole 55 bends in an L-shape and extends toward the base housing 2a in a direction parallel to the central axis C of the rotation shaft 8. The length of the pole 55 of each tooth 54 bent and extending in the direction of the central axis C is half the length of the pole 55 included in the W-phase core 14 (or the U-phase core 11).

The second V-phase core 13 and the first V-phase core 12 having the same shape are fixed to the boss 3 at different orientations. This enables the second V-phase core 13 to be used as the first V-phase core 12. In the first embodiment, the first V-phase core 12 and the second V-phase core 13 are placed one above the other to form a single V-phase core 15.

The V-phase core 15 is arranged between the U-phase core 11 and the W-phase core 14. The first V-phase core 12 is arranged to face the U-phase core 11, whereas the second V-phase core 13 is arranged to face the W-phase core 14. In this arrangement, the flange 23 of the U-phase core 11 and the flange 43 of the V-phase core 15 (the first V-phase core 12) come in contact with each other. The flange 53 of the V-phase core 15 (the second V-phase core 13) and the flange 33 of the W-phase core 14 also come in contact with each other.

The poles 25 of the U-phase core 11, the poles 35 of the W-phase core 14, and the poles 45 (55) of the V-phase core 15 (the first V-phase core 12 and the second V-phase core 13) are arranged alternately to define the outer circumference of a circle having the central axis C as its center. In other words, the poles 25, 35, and 45 (55) are arranged at intervals of 20 degrees in the circumferential direction.

The first coil C1 wound around the flanges 23 and 43, which are in contact with each other, is arranged in a space defined by the U-phase core 11 and the V-phase core 15 (the first V-phase core 12). The second coil C2 wound around the flanges 53 and 33, which are in contact, is arranged in a space defined by the V-phase core 15 (the second V-phase core 13) and the W-phase core 14.

Figure 4:
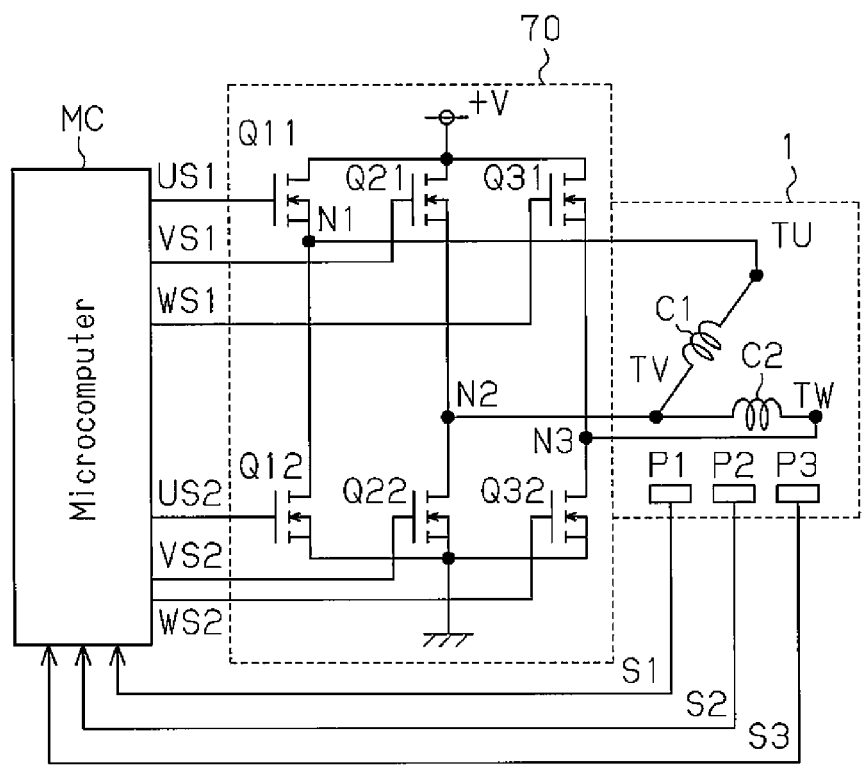
FIG. 4 is an electrical schematic showing the motor of FIG. 1A and a three-phase inverter circuit.

The first coil C1 and the second coil C2 are wound in the same direction. In the first embodiment, the first coil C1 and the second coil C2 are connected in series as shown in FIG. 4. The first coil C1 and the second coil C2 have the same number of windings and the same winding resistance. A common terminal connecting the first coil C1 and the second coil C2$i$ is referred to as a V-terminal TV. A terminal of the first coil C1 opposite to the V-terminal TV is referred to as a U-terminal TU. A terminal of the second coil C2 opposite to the V-terminal TV is referred to as a W-terminal TW.

The stator 10 includes the first coil C1, the second coil C2, the U-phase core 11, the V-phase core 15, and the W-phase core 14, and is fixed to the boss 3 formed on the base housing 2a. The stator 10 of the first embodiment includes two (the first coil C1 and the second coil C2) of three phases of coils connected by delta connection. Currents supplied to the U-terminal TU, the V-terminal TV, and the W-terminal TW are controlled to generate a rotating magnetic field on each of the poles 25, 35, and 45 (55) of the stator 10.

Inside the motor housing 2, a rotor 60 is arranged in a rotatable manner outside the stator 10 in the radial direction as shown in FIGS. 1A and 1B. The rotor 60 includes a yoke 61, which has a circular lid 62 and an annular wall 63. The rotation shaft 8 is extended through and fixed at the center of the lid 62. The annular wall 63 can surround the stator 10. A plurality of (sixteen in the first embodiment) magnets 64 are fixed on the inner surface of the annular wall 63 in the circumferential direction. The sixteen magnets 64 are arranged in a manner that different magnetic poles (north poles and south poles) are arranged alternately in the circumferential direction.

As the rotating magnetic field is generated in each of the poles 25, 35, and 45 (55) of the stator 10, the rotor 60 rotates about the rotation shaft 8 integrally with the rotation shaft 8. In other words, the motor 1 of the first embodiment is of an outer rotor type.

The electric schematic for generating a rotating magnetic field on each of the poles 25, 35, and 45 (55) will now be described with reference to FIG. 4.

In FIG. 4, the first coil C1 and the second coil C2 are connected to a three-phase inverter circuit 70 including a three-phase bridge circuit.

The circuit 70 includes a series circuit in which a first upper arm transistor Q11 and a first lower arm transistor Q12 are connected in series. The three-phase inverter circuit 70 includes a series circuit in which a second upper arm transistor Q21 and a second lower arm transistor Q22 are connected in series. The three-phase inverter circuit 70 includes a series circuit in which a third upper arm transistor Q31 and a third lower arm transistor Q32 are connected in series. These series circuits are connected to each other in parallel to form a parallel circuit. The parallel circuit is connected between a positive terminal and a negative terminal of a direct current (DC) power supply.

The first upper arm transistor Q11 and the first lower arm transistor Q12 are N-channel power metal oxide semiconductor (MOS) transistors. A connecting point (node N1) between the source of the first upper arm transistor Q11 and the drain of the first lower arm transistor Q12 is connected to the U-terminal TU.

Figure 5:
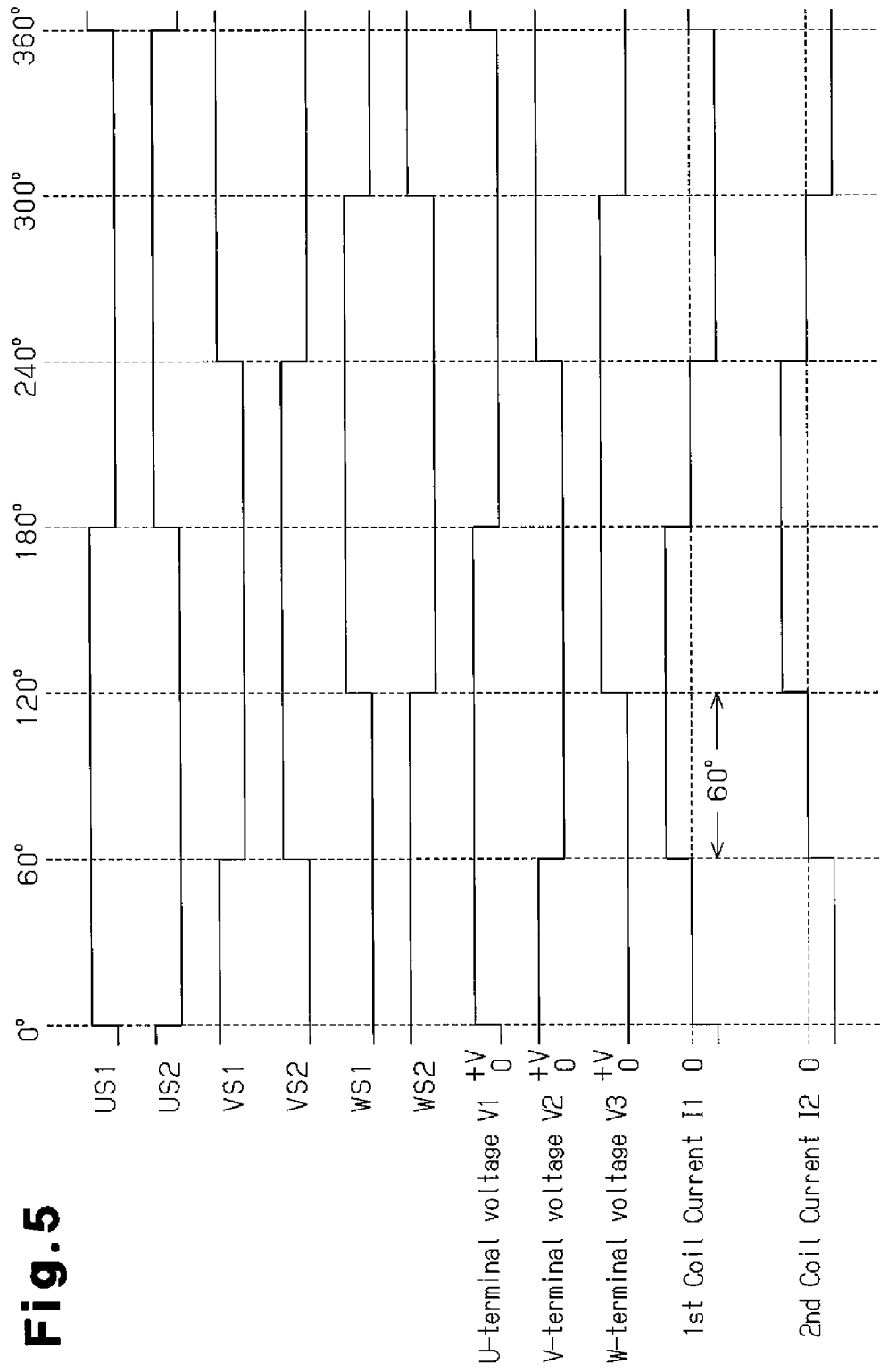
FIG. 5 is a waveform diagram showing gate signals output to the three-phase inverter circuit of FIG. 4.

A first upper gate signal US1 is input to the gate terminal of the first upper arm transistor Q11. A first lower gate signal US2 is input to the gate terminal of the first lower arm transistor Q12. The first upper gate signal US1 and the first lower gate signal US2 are complementary to each other as shown in FIG. 5. When the first upper gate signal US1 has an H level, the first lower gate signal US2 has an L level. When the first upper gate signal US1 has an L level, the first lower gate signal US2 has an H level.

When the first upper arm transistor Q11 is on, the first lower arm transistor Q12 is off. When the first upper arm transistor Q11 is off, the first lower arm transistor Q12 is on. When the first upper arm transistor Q11 is on and the first lower arm transistor Q12 is off, current is supplied to the U-terminal TU of the first coil C1. When the first upper arm transistor Q11 is off and the first lower arm transistor Q12 is on, no current is supplied to the U-terminal TU.

The second upper arm transistor Q21 and the second lower arm transistor Q22 are N-channel power MOS transistors. A connecting point (node N2) between the source of the second upper arm transistor Q21 and the drain of the second lower arm transistor Q22 is connected to the V-terminal TV.

A second upper gate signal VS1 is input to the gate terminal of the second upper arm transistor Q21. A second lower gate signal VS2 is input to the gate terminal of the second lower arm transistor Q22. The second upper gate signal VS1 and the second lower gate signal VS2 are complementary to each other as shown in FIG. 5. When the second upper gate signal VS1 has an H level, the second lower gate signal VS2 has an L level. When the second upper gate signal VS1 has an L level, the second lower gate signal VS2 has an H level.

When the second upper arm transistor Q21 is on, the second lower arm transistor Q22 is off. When the second upper arm transistor Q21 is off, the second lower arm transistor Q22 is on. When the second upper arm transistor Q21 is on and the second lower arm transistor Q22 is off, current is supplied to the V-terminal TV. When the second upper arm transistor Q21 is off and the second lower arm transistor Q22 is on, no current is supplied to the V-terminal TV.

The third upper arm transistor Q21 and the third lower arm transistor Q32 are N-channel power MOS transistors. A connecting point (node N3) between the source of the third upper arm transistor Q31 and the drain of the third lower arm transistor Q32 is connected to the W-terminal TW.

A third upper gate signal WS1 is input to the gate terminal of the third upper arm transistor Q31. A third lower gate signal WS2 is input to the gate terminal of the third lower arm transistor Q32. The third upper gate signal WS1 and the third lower gate signal WS2 are complementary to each other as shown in FIG. 5. When the third upper gate signal WS1 has an H level, the third lower gate signal WS2 has an L level. When the third upper gate signal WS1 has an L level, the third lower gate signal WS2 has an H level.

When the third upper arm transistor Q31 is on, the third lower arm transistor Q32 is off. When the third upper arm transistor Q31 is off, the third lower arm transistor Q32 is on. When the third upper arm transistor Q31 is on and the third lower arm transistor Q32 is off, current is supplied to the W-terminal TW. When the third upper arm transistor Q31 is off and the third lower arm transistor Q32 is on, no current is supplied to the W-terminal TW.

The gate terminals of the arm transistors Q11, Q31, Q12, Q22, and Q32 are connected to a microcomputer MC. The microcomputer MC outputs gate signals US1, VS1, WS1, US2, VS2, and WS2 to the gate terminals of the transistors Q11, Q21, Q31, Q12, Q22, and Q32 to control the motor 1 to rotate via the three-phase inverter circuit 70.

The microcomputer MC is connected to three position sensors P1, P2, and P3, each of which is formed by a hole IC for detecting the rotational position of the rotor 60 (the rotation shaft 8). The three sensors, or the first to third position sensors P1, P2, and P3, are arranged on the motor 1 at intervals of 120 degrees. The microcomputer MC receives first to third position signals S1, S2, and S3 provided respectively from the first to third position sensors P1, P2, and P3. The microcomputer MC then obtains the rotational position of the rotor 60, the number of rotations, the rotating direction, and other information on the rotor 60 based on the first to third position signals S1, S2, and S3.

At the timings shown in FIG. 5, the microcomputer MC generates first to third upper gate signals US1, VS1, and WS1 and first to third lower gate signals US2, VS2, and WS2, which are 180-degree square-wave signals, based on the rotational position of the rotor 60 calculated based on the first to third position signals S1 to S3.

In detail, when the first upper gate signal US1 rises from an L level (low level) to an H level (high level) at an electrical angle of 0 degrees, the second upper gate signal VS1 falls from an H level to an L level at an electrical angle of 60 degrees, and the third upper gate signal WS1 rises from an L level to an H level at an electrical angle of 120 degrees.

When the first upper gate signal US1 falls from an H level to an L level at an electrical angle of 180 degrees, the second upper gate signal VS1 rises from an L level to an H level at an electrical angle of 240 degrees, and the third upper gate signal WS1 falls from an H level to an L level at an electrical angle of 300 degrees.

When the upper gate signals US1, VS1, and WS1 have an H level, voltages +V are supplied from the DC power supply to the U-terminal TU, the V-terminal TV, and the W-terminal TW respectively as a U-terminal voltage V1, a V-terminal voltage V2, and a W-terminal voltage V3.

The microcomputer MC then outputs the upper gate signals US1, VS1, and WS1 and the lower gate signals US2, VS2, and WS2 to the three-phase inverter circuit 70 at the timings shown in FIG. 5. This generates a rotating magnetic field, which rotates the motor 1.

Generation of the rotating magnetic field will now be described with reference to FIG. 6.

[Electrical Angles of 0 to 60 Degrees]

During this period, the voltages +V from the DC power supply are applied to the U-terminal TU and the V-terminal TV as the U-terminal voltage V1 and the V-terminal voltage V2. In this state, the W-terminal TW is grounded. No coil current I1 flows through the first coil C1. A second coil current I2 flows through the second coil C2 from the V-terminal TW toward the W-terminal TW.

In this state, no current flows from the U-terminal TU to the W-terminal TW via the first coil C1, the V-terminal VT, and the second coil C2. A magnetic field formed by the second coil current I2 flowing through the second coil C2 solely determines the magnitude and the rotational angle of the magnetic field generated by the motor. The resulting rotating magnetic field has a rotational angle of 30 degrees (bar W-phase).

[Electrical Angles of 60 to 120 Degrees]

During this period, the voltage +V from the DC power supply is applied to the U-terminal TU as the U-terminal voltage V1. In this state, the V-terminal TV and the W-terminal TW are grounded. A coil current I1 flows through the first coil C1 from the U-terminal TU toward the V-terminal TV. No second coil current I2 flows through the second coil C2.

In this state, no current flows from the U-terminal TU to the W-terminal TW via the first coil C1, the V-terminal VT and the second coil C2. A magnetic field formed by the first coil current I1 flowing through the first coil C1 solely determines the magnitude and the rotational angle of the magnetic field generated by the motor. The resulting rotating magnetic field has the same rotational angle as the rotating magnetic field generated at the electrical angles of 0 to 60 degrees, and has a rotational angle of 90 degrees (U-phase).

[Electrical Angles of 120 to 180 Degrees]

During this period, the voltages +V from the DC power supply are applied to the U-terminal TU and the W-terminal TW as the U-terminal voltage V1 and the W-terminal voltage V3. In this state, the V-terminal TV is grounded. The first coil current I1 flows through the first coil C1 from the U-terminal TU toward the V-terminal TV. The second coil current I2 flows through the second coil C2 from the W-terminal TW toward the V-terminal TV.

In this state, a synthetic magnetic field including a magnetic field formed by the first coil current I1 flowing through the first coil C1 and a magnetic field formed by the second coil current I2 flowing through the second coil C2 determines the rotational angle of the magnetic field generated by the motor. The resulting rotating magnetic field has the same rotational angle as the rotating magnetic field generated at the electrical angles of 0 to 60 degrees, and has a rotational angle of 150 degrees (bar V-phase).

[Electrical Angles of 180 to 240 Degrees]

During this period, the voltage +V from the DC power supply is applied to the W-terminal TW as the W-terminal voltage V3. In this state, the U-terminal TU and the V-terminal TV are grounded. No first coil current I1 flows through the first coil C1. The second coil current I2 flows through the second coil C2 from the W-terminal TW toward the V-terminal TV.

In this state, no current flows from the W-terminal TW to the U-terminal TU via the second coil C2, the V-terminal TV, and the first coil C1. A magnetic field formed by the second coil current I2 flowing through the second coil C2 solely determines the rotational angle of the magnetic field generated by the motor. The resulting rotating magnetic field has the same rotational angle as the rotating magnetic field generated at the electrical angles of 0 to 60 degrees, and has a rotational angle of 210 degrees (bar W-phase).

[Electrical Angles of 240 to 300 Degrees]

During this period, the voltages +V from the DC power supply are applied to the V-terminal TV and the W-terminal TW as the V-terminal voltage V2 and the W-terminal voltage V3. In this state, the U-terminal TU is grounded. The first coil current I1 flows through the first coil C1 from the V-terminal TV toward the U-terminal TU. No second coil current I2 flows through the second coil C2.

In this state, no current flows from the W-terminal TW to the U-terminal TU via the second coil C2, the V-terminal TV, and the first coil C1. A magnetic field formed by the first coil current I1 flowing through the first coil C1 solely determines the rotational angle of the magnetic field generated by the motor. The resulting rotating magnetic field has the same rotational angle as the rotating magnetic field generated at the electrical angles of 0 to 60 degrees, and has a rotational angle of 270 degrees (bar U-phase).

[Electrical Angles of 300 to 360 Degrees]

During this period, the voltage +V from the DC power supply is applied to the V-terminal TV as the V-terminal voltage V2. In this state, the U-terminal TU and the W-terminal TW are grounded. The first coil current I1 flows through the first coil C1 from the V-terminal TV toward the U-terminal TU. The second coil current I2 flows through the second coil C2 from the V-terminal TV to the W-terminal TW.

In this state, a synthetic magnetic field including a magnetic field formed by the first coil current I1 flowing through the first coil C1 and a magnetic field formed by the second coil current I2 flowing through the second coil C2 determines the rotational angle of the magnetic field generated by the motor. The resulting rotating magnetic field has the same rotational angle as the rotating magnetic field generated at the electrical angles of 0 to 60 degrees, and has a rotational angle of 330 degrees (V-phase).

Figure 6:
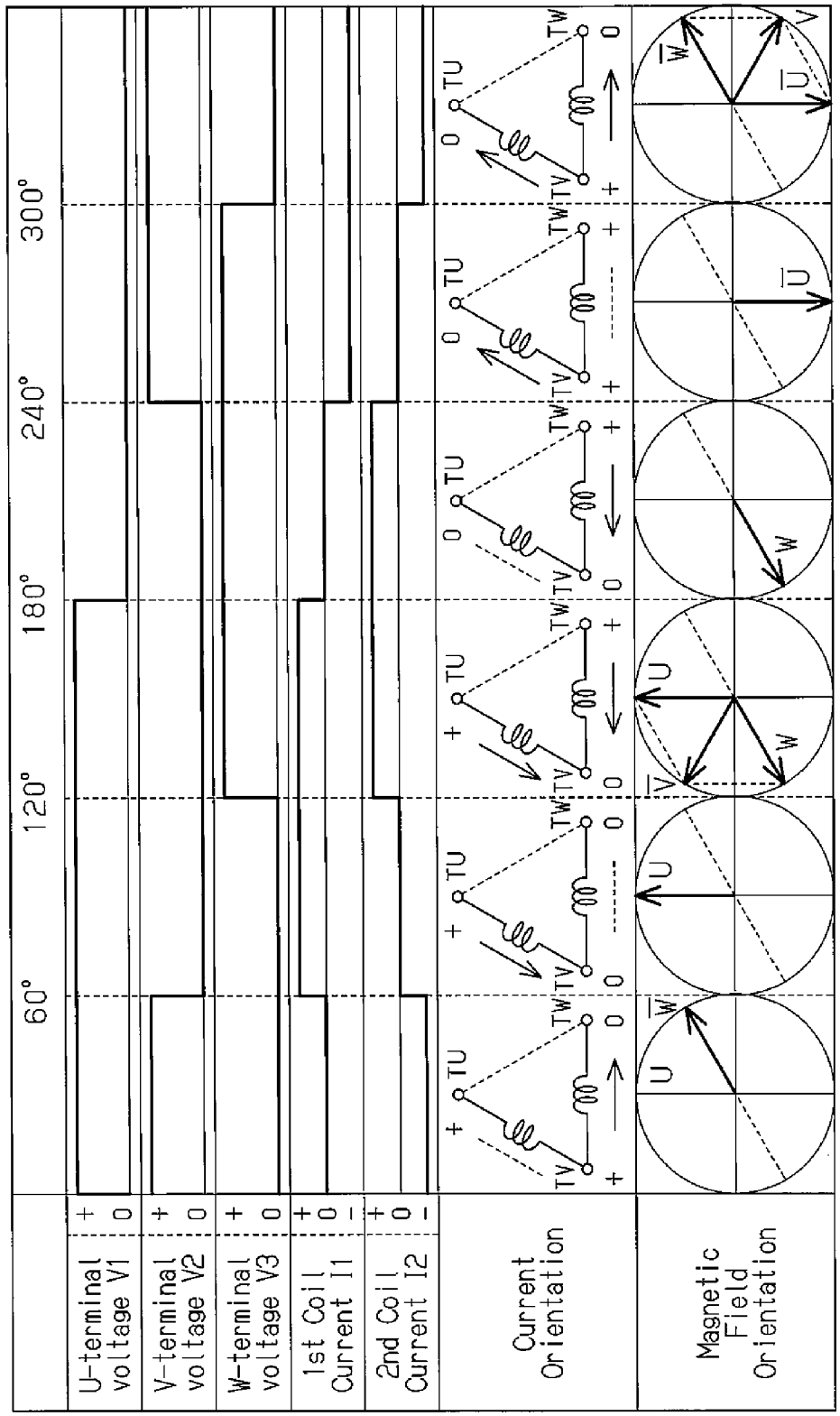
FIG. 6 is a diagram showing a rotating magnetic field generated in the motor of FIG. 1A.

In this manner, the U-terminal voltage V1, the V-terminal voltage V2, and the W-terminal voltage V3 are applied to the terminals TU, TV, and TW of the coils C1 and C2 at the predetermined timings as shown in FIG. 6. This causes the first coil current I1 and the second coil current I2 having a phase difference of 60 degrees to flow through the coils C1 and C2 to generate a circular magnetic field. In other words, this causes the coils C1 and C2 to sequentially generate a unidirectional magnetic field at an interval of 60 degrees in the circumferential direction, and also enables the magnetic field with the same magnitude to be generated at any electrical angle position.

The motor with this structure prevents a torque ripple from being generated in accordance with the electrical angle, and prevents noise and vibration caused by such a torque ripple.

The motor 1 having the above-described structure has the advantages described below.

(1) In the first embodiment, the stator 10 includes the U-phase core 11, the V-phase core 15, and the W-phase core 14, between which the first coil C1 and the second coil C2 wound in the same direction are arranged and are connected in series.

The first coil current I1 and the second coil current I2 having a phase difference of 60 degrees are supplied through the first coil C1 and the second coil C2 via the V-terminal TV, the U-terminal TU, and the W-terminal TW.

This enables the stator 10 to generate a circular rotating magnetic field, and prevents a torque ripple from being generated in accordance with the electrical angle of the motor 1, and prevents noise and vibration of the motor 1 caused by such a torque ripple.

The motor 1 including two (the first coil C1 and the second coil C2) of three phases of coils can generate a circular rotating magnetic field when the first coil current I1 and the second coil current I1 having a phase difference of 60 degrees are supplied to flow through the two phases of coils using the three-phase inverter circuit 70. The motor 1 eliminating one phase and including only the two phases of coils thus prevents a torque ripple from being generated in accordance with the electrical angle of the motor and prevents noise and vibration caused by such a torque ripple.

(2) The motor 1 of the first embodiment is a claw pole three-phase brushless motor including only two of three phases of coils. This structure reduces the number of components of the motor 1 and downsizes the motor 1.

Figure 7:
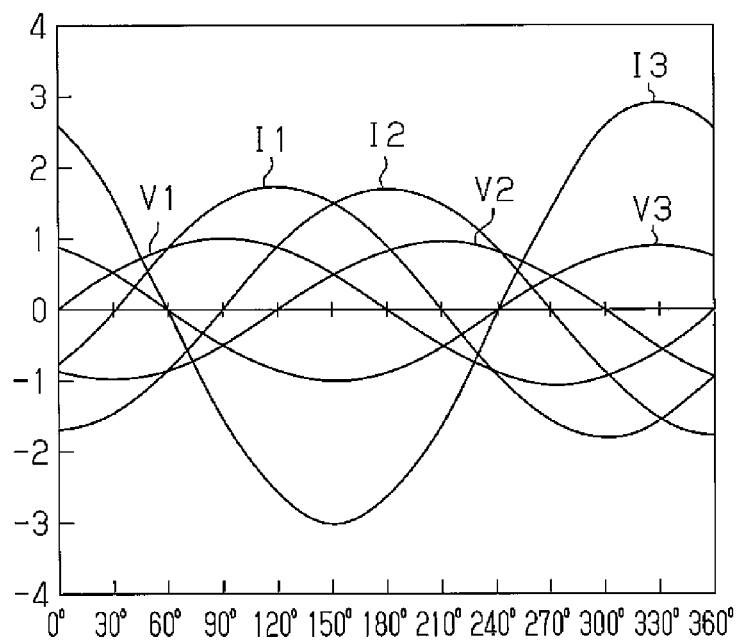
FIG. 7 is a waveform diagram of sine wave voltages applied to a motor according to a modification of the first embodiment.

In the first embodiment, square-wave voltages are applied to the terminals TU, TV, and TW. However, sine wave voltages (V1, V2, and V3) having a phase difference of 120 degrees may be applied to the U-terminal TU, the V-terminal TV, and the W-terminal TW. Also, sine wave currents (the first coil current I1 and the second coil current I2) having a phase difference of 60 degrees may be supplied to the U-terminal TU and the W-terminal TW as shown in FIG. 7. Although the voltage utilization efficiency is low in this case, this control also enables the motor to generate a circular rotating magnetic field and generate a stable torque.

In the drawings, I3 indicates a current flowing between the V-terminal TV and the node N2.

Figure 8:
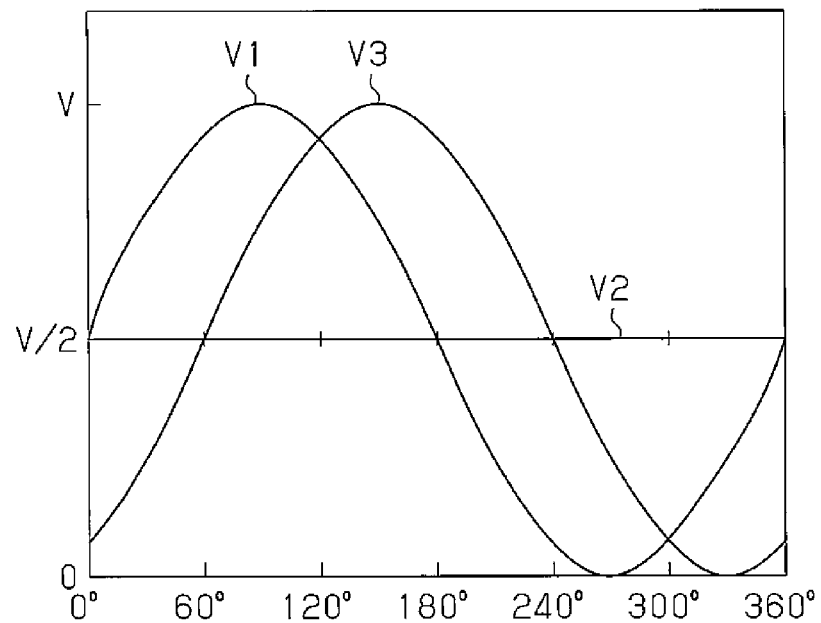
FIG. 8 is a waveform diagram of sine wave voltages applied to a motor according to another modification of the first embodiment.
Figure 9:
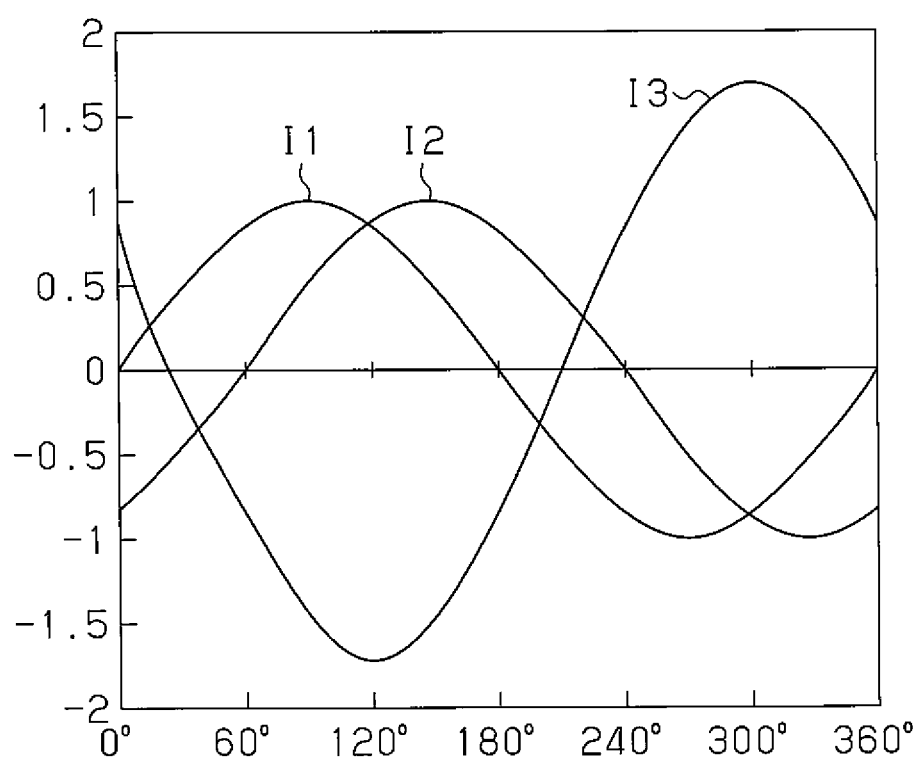
FIG. 9 is a waveform diagram of sine wave currents flowing through the motor according to the modification of FIG. 8.

As shown in FIG. 8, a V-terminal voltage V2, which is half the voltage +V supplied from the DC power supply, may be applied to the V-terminal TV, and sine wave voltages having a phase difference of 60 degrees may be applied to the U-terminal TU and the W-terminal TW. As shown in FIG. 9, sine wave currents (the first coil current I1 and the second coil current I2) having a phase difference of 60 degrees may be supplied to the U-terminal TU and the W-terminal TW. In this case, the voltage utilization efficiency is even lower. However, this control also enables the motor to generate a circular rotating magnetic field and generate a stable torque.

Second Embodiment

A second embodiment of the present invention will now be described with reference to FIG. 10.

In the first embodiment, the first to third lower arm transistors Q12, Q22, and Q32 are on when the corresponding first to third upper arm transistors Q11, Q21, and Q31 included in the three-phase inverter circuit 70 are off.

In the second embodiment, the first to third lower arm transistors Q12, Q22, and Q32 are turned on and off intermittently when the corresponding first to third upper arm transistors Q11, Q21, and Q31 included in the three-phase inverter circuit 70 are off.

For ease of explanation, the components in the second embodiment that are the same as the components in the first embodiment are given the same numerals as those components and will not be described in detail.

Figure 10:
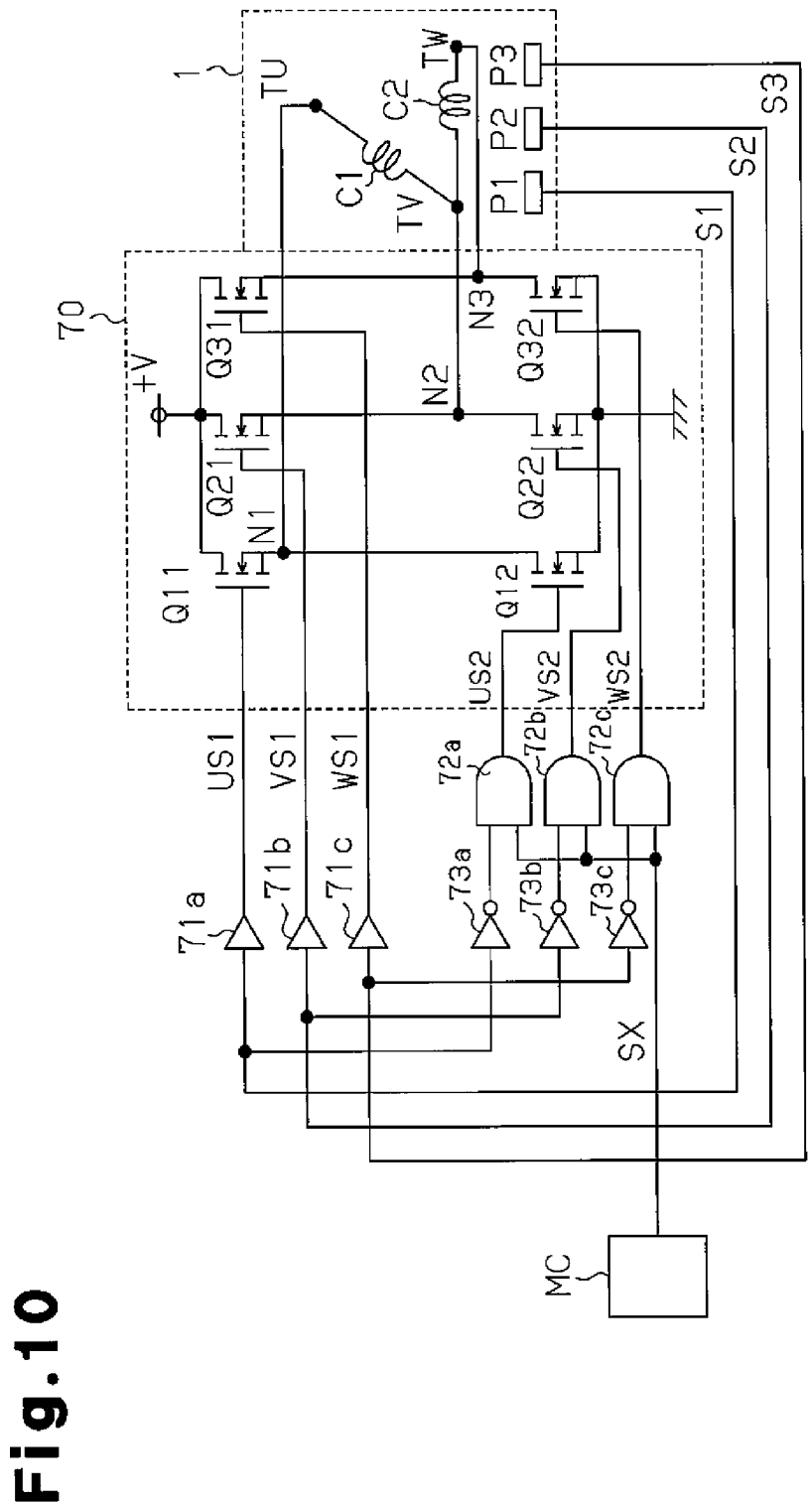
FIG. 10 is an electrical schematic showing a motor according to a second embodiment of the present invention.

In FIG. 10, the gate terminals of the first to third upper arm transistors Q11, Q21, and Q31 are connected to the first to third position sensors P1 to P3 via the first to third buffer circuits 71a, 71b, and 71c.

Figure 11:
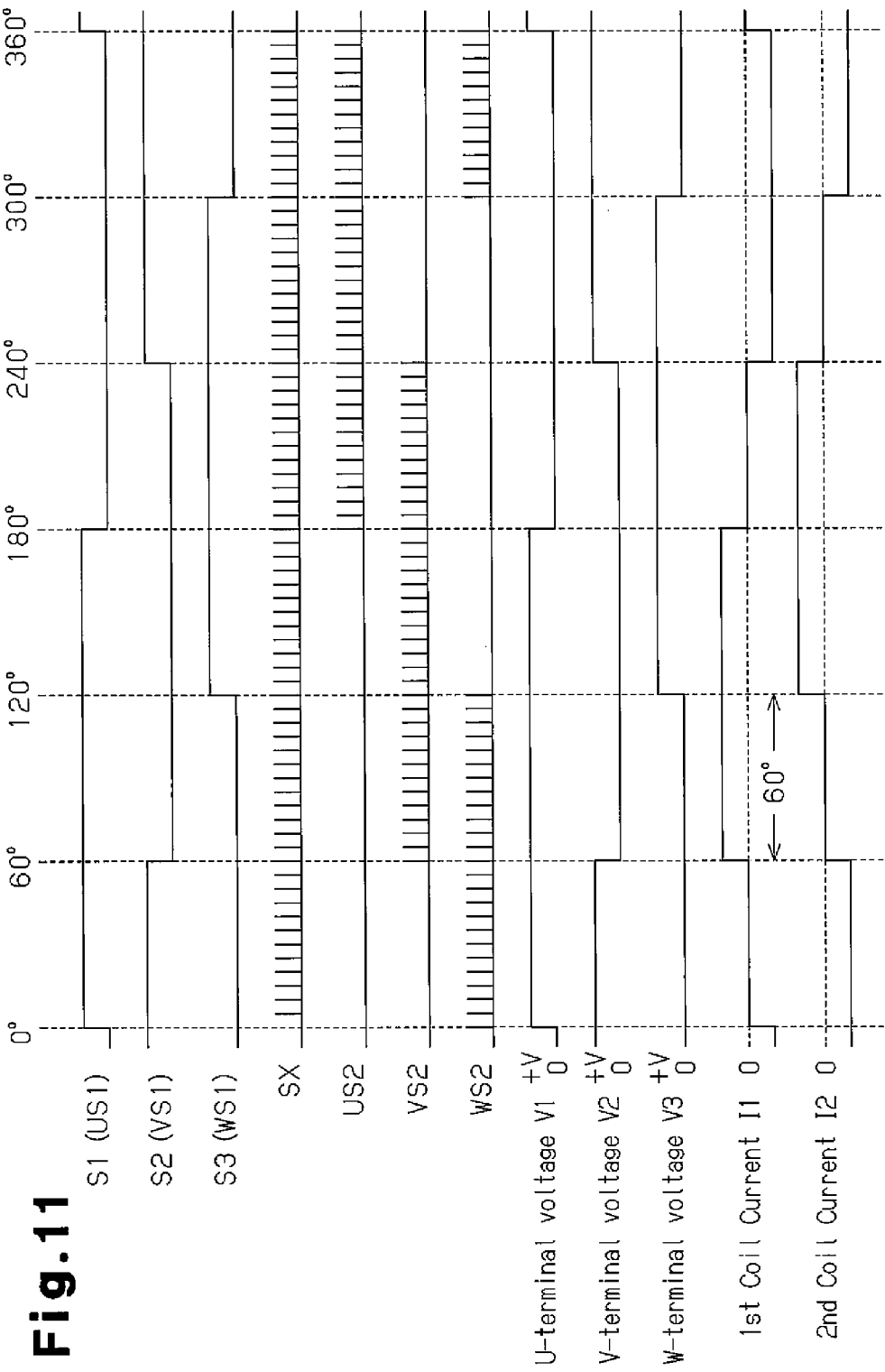
FIG. 11 is a waveform diagram of control signals output to the three-phase inverter circuit of FIG. 10.

The first to third position sensors P1 to P3 are arranged in the motor 1 at an interval of 120 degrees. The first to third position sensors P1 to P3 detect the rotational position of the rotor 60. The first to third position signals S1, S2, and S3 from the first to third position sensors P1 to P3 are 180-degree square-wave signals as shown in FIG. 11. With the first to third position sensors P1 to P3 arranged at an interval of 120 degrees, the first to third position signals S1, S2, and S3 are output with a phase difference of 120 degrees.

The first buffer circuit 71a receives the first position signal S1 from the first position sensor P1, and outputs the first position signal S1 to the gate terminal of the first upper arm transistor Q11 as the first upper gate signal US1. The second buffer circuit 71b receives the second position signal S2 from the second position sensor P2, and outputs the second position signal S2 to the gate terminal of the second upper arm transistor Q21 as the second upper gate signal VS1. The third buffer circuit 71c receives the third position signal S3 from the third position sensor P3, and outputs the third position signal S3 to the gate terminal of the third upper arm transistor Q31 as the third upper gate signal WS1.

The gate terminals of the first to third lower arm transistors Q12, Q22, and Q32 are connected to the output terminals of first to third AND circuits 72a, 72b, and 72c. The first to third AND circuits 72a to 72c each have a first input terminal and a second input terminal. The first input terminals of the first to third AND circuits 72a to 72c are connected to the output terminals of first to third inverter circuits 73a to 73c. Pulse-width modulation (PWM) signals SX provided from the microcomputer MC are input to the second input terminals of the first to third AND circuits 72a to 72c.

In detail, the first inverter circuit 73a receives the first position signal S1, and inverts the first position signal S1 and outputs the inverted signal to the first AND circuit 72a. The second inverter circuit 73b receives the second position signal S2, and inverts the second position signal S2 and outputs the inverted signal to the second AND circuit 72b. The third inverter circuit 73c receives the third position signal S3, and inverts the third position signal S3 and outputs the inverted signal to the third AND circuit 72c.

As shown in FIG. 11, the first AND circuit 72a outputs the PWM signal SX provided from the microcomputer MC to the gate terminal of the first lower arm transistor Q12 as the first lower gate signal US2 when the first position signal S1 has an L level.

The second AND circuit 72b outputs the PWM signal SX provided from the microcomputer MC to the gate terminal of the second lower arm transistor Q22 as the second lower gate signal VS2 when the second position signal S2 has an L level.

The third AND circuit 72c outputs the PWM signal SX provided from the microcomputer MC to the gate terminal of the third lower arm transistor Q32 as the third lower gate signal WS2 when the third position signal S3 has an L level.

The motor 1 having the above-described structure has the advantages described below.

(3) In the second embodiment, the PWM signals SX provided from the microcomputer MC cause the corresponding first to third lower arm transistors Q12, Q22, and Q32 to be on and off intermittently when the first to third upper arm transistors Q11, Q21, and Q31 included in the third-phase inverter circuit 70 are off.

In addition to the advantages of the first embodiment, the motor of the second embodiment executes torque control with higher accuracy.

Third Embodiment

A third embodiment of the present invention will now be described with reference to FIG. 12.

The third embodiment relates to a control circuit that executes current vector control over the claw pole three-phase brushless motor 1 of the first embodiment that from which the coil for one phase is eliminated. In detail, the control circuit according to the third embodiment generates the gate signals US1, US2, VS1, VS2, WS1, and WS2, which are output to the transistors Q11, Q12, Q21, Q22, Q31, and Q32 included in the three-phase inverter circuit 70.

For ease of explanation, the components in the third embodiment that are the same as the components in the first embodiment are given the same numerals as those components and will not be described in detail.

Figure 12:
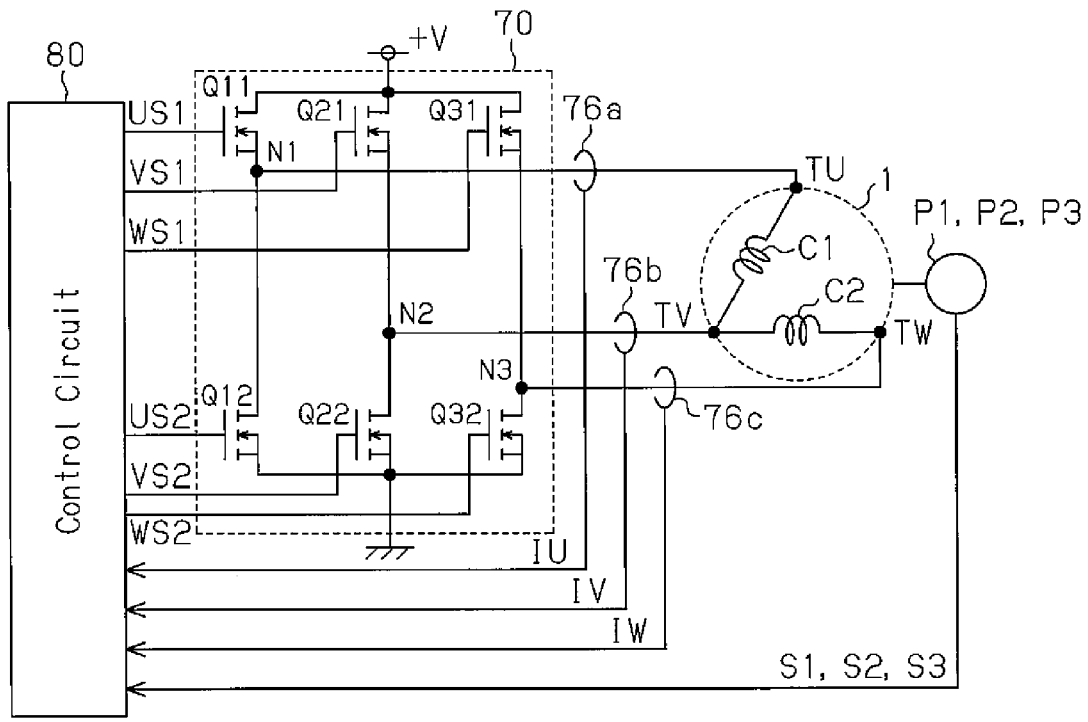
FIG. 12 is an electrical schematic showing a motor according to a third embodiment of the present invention.

In FIG. 12, the gate terminals of the first to third upper arm transistors Q11, Q21, and Q31 are connected to a control circuit 80. The gate terminals of the first to third lower arm transistors Q12, Q22, and Q32 are also connected to the control circuit 80.

In detail, the control circuit 80 outputs the first to third upper gate signals US1, VS1, and WS1 to the gate terminals of the first to third upper arm transistors Q11, Q21, and Q31. The control circuit 80 outputs the first to third lower gate signals US2, VS2, and WS2 to the gate terminals of the first to third lower arm transistors Q12, Q22, and Q32.

The control circuit 80 is connected to first to third current detectors 76a, 76b, and 76c included in the claw pole three-phase brushless motor 1. The first current detector 76a detects a U-phase current IU (=I1) flowing between the U-terminal TU and the node N1, and outputs the detected signal to the control circuit 80. The second current detector 76b detects a V-phase current IV (=I3) flowing between the V-terminal TV and the node N2, and outputs the detected signal to the control circuit 80. The third current detector 76c detects a W-phase current IW (=I2) flowing between the W-terminal TW and the node N3, and outputs the detected signal to the control circuit 80.

The control circuit 80 receives the detected values of the present U-phase current IU, the V-phase current IV, and the W-phase current IW from the first to third current detectors 76a, 76b, and 76c.

The control circuit 80 receives the first to third position signals S1 to S3 from the first to third position sensors P1 to P3, which detect the rotational position of the rotor 60 (the rotation shaft 8) arranged in the motor 1.

Figure 13:
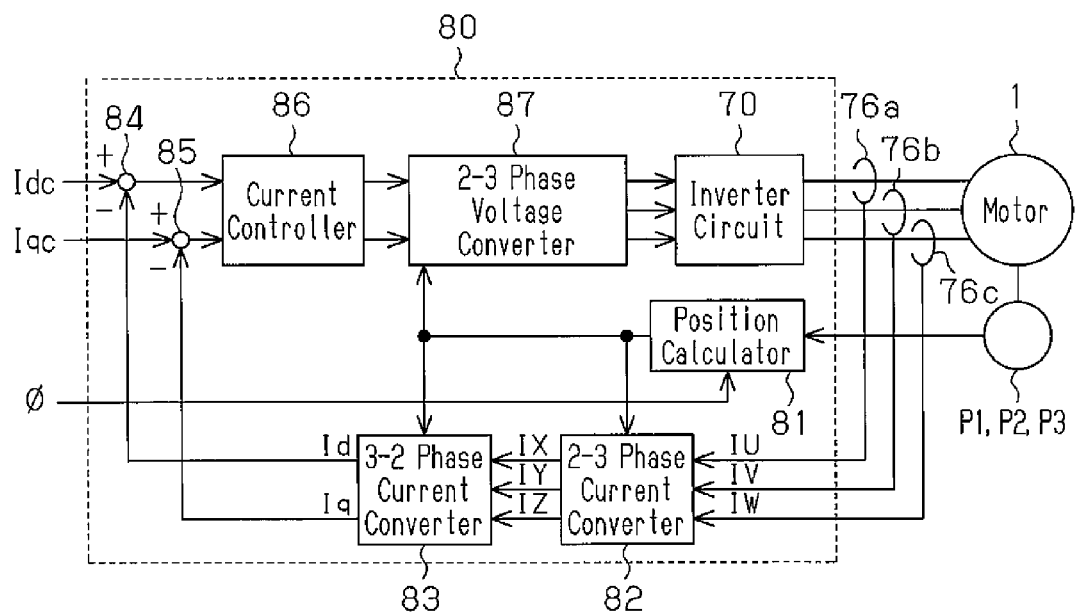
FIG. 13 is an electric block schematic showing an electric configuration of the control circuit of FIG. 12.

As shown in FIG. 13, the control circuit 80 includes a position calculator 81, a two-three phase current converter 82, a three-two phase current converter 83, a d-axis subtractor 84, a q-axis subtractor 85, a current controller 86, and a two-three phase voltage controller 87. These components of the control circuit 80 are used for current vector control.

The position calculator 81 receives the first to third position signals S1 to S3 from the first to third position sensors P1 to P3, and calculates the corresponding electrical angle and the corresponding electrical angle velocity of the rotor 60 (the rotation shaft 8) accordingly. The electrical angle is the rotational angle in the d-q axis coordinate system as viewed from the α-β axis coordinate system having the α-phase axis matching the U-phase axis among the three phases. The position calculator 81 receives an electrical angle command value ø from an external unit (not shown).

The two-three phase current converter 82 is connected to the first to third current detectors 76a, 76b, and 76c. The two-three current converter 82 receives detected signals of the present U-phase current IU, the V-phase current IV, and the W-phase current IW.

The two-three phase current converter 82 converts the detected values of the U-phase current IU, the V-phase current IV, and the W-phase current IW to currents for three phases used in a three-phase motor.

The motor 1 of the third embodiment is a two-phase motor that does not include the coil for one phase. The two-three phase current converter 82 assumes three hypothetic terminals by equivalent conversion of the two-phase motor to a three-phase motor, and calculates three-phase alternating currents IX, IY, and IZ respectively flowing through the three hypothetic terminals and outputs the alternating currents for three phases.

The two-three phase current converter 82 calculates the three-phase alternating currents IX, IY, and IZ using equations 1 to 3, which are shown below.

$$IX = IU + IV/3 \quad \text{Equation 1}$$

$$IY = IV/3 \quad \text{Equation 2}$$

$$IZ = IW + IV/3 \quad \text{Equation 3}$$

The three-phase alternating currents IX, IY, and IZ calculated by the two-three phase current converter 82 are output to the three-two current converter 83.

The three-two phase current converter 83 converts the three-phase alternating currents IX, IY, and IZ to a d-axis actual current value Id and a q-axis actual current value Iq in the two-axis rotating system of coordinates (the d-q axis coordinate system), which rotates in synchronization with the frequencies of the terminal voltages V1 to V3 applied to the first coil C1 and the second coil C2.

The conversion equations are equations 4 and 5 below.

$$Id = \sqrt{\frac{2}{3}} \left\{ IX \times \cos(\theta + \emptyset) + IY \times \cos\left(\theta + \emptyset - \frac{2}{3}\pi\right) + IZ + \cos\left(\theta + \emptyset + \frac{2}{3}\pi\right) \right\} \quad \text{Equation 4}$$

$$Iq = -\sqrt{\frac{2}{3}} \left\{ IX \times \sin(\theta + \emptyset) + IY \times \sin\left(\theta + \emptyset - \frac{2}{3}\pi\right) + IZ \times \sin\left(\theta + \emptyset + \frac{2}{3}\pi\right) \right\} \quad \text{Equation 5}$$

In the equations, the value θ+ø is obtained by adding the electrical angle θ calculated by the position calculator 81 and the electrical angle command value ø provided from an external device (not shown). The value θ+ø is input from the position calculator 81.

The three-two current converter 83 outputs the resulting d-axis actual current value Id to the d-axis subtractor 84 and the resulting q-axis actual current value Iq to the q-axis subtractor 85.

The d-axis subtractor 84 subtracts the d-axis actual current value Id from a d-axis current command value Idc output from the external device (not shown), and outputs the difference to the current controller 86.

The q-axis subtractor 85 subtracts the q-axis current command value Iq output from the external device (not shown) from a q-axis current command value Iqc, and outputs the difference to the current controller 86.

The current controller 86 calculates a d-axis voltage command value Vdc and a q-axis voltage command value Vqc based on the differences output from the d-axis subtractor 84 and the q-axis subtractor 85 so that currents flow as required by the d-axis current command value Idc and the q-axis current command value Iqc. The current controller 86 outputs the calculated d-axis voltage command value Vdc and the calculated q-axis voltage command value Vqc to the two-three phase voltage converter 87.

The two-three phase voltage converter 87 generates the gate signals US1, VS1, WS1, US2, VS2, and WS2 shown in FIG. 11, which are the three-phase voltage command values for the motor 1, in accordance with the d-axis voltage command value Vdc and the q-axis voltage command value Vqc in the d-q coordinate system and the electrical angle θ and the electrical angle command value ø output from the position calculator 81.

In detail, the two-three phase voltage converter 87 generates the gate signals US1, VS1, WS1, US2, VS2, and WS2 in a manner that the U-terminal voltage V1, the V-terminal voltage V2, and the W-terminal voltage V3 having a phase difference corresponding to an electrical angle of 120 degrees are applied to the U-terminal TU, the V-terminal TV, the W-terminal TW as shown in FIG. 11.

As a result, the U-phase current IU (the first coil current I1) and the W-phase current IW (the second coil current I2) having a phase difference corresponding to an electrical angle of 60 degrees flow through the first coil C1 and the second coil C2 connected to the three-phase inverter circuit 70.

The first to third upper gate signals US1, VS1, and WS1 generated in the two-three phase voltage converter 87 are then output to the corresponding first to third buffer circuits 71a, 71b, and 71c and the corresponding first to third inverter circuits 73a, 73b, and 73c.

The claw pole three-phase brushless motor 1 having the above-described structure including two of three phases of coils has the advantages described below.

(4) In the third embodiment, the motor 1 including only two (the first coil C1 and the second coil C2) of three phases of coils can maintain the rotating magnetic field and can execute current vector control when only the two phases of coils (the first coil C1 and the second coil C2) are connected to the three-phase inverter circuit 70.

(5) The third embodiment is also applicable to a claw pole three-phase brushless motor 1 including three phases of coils known in the art.

For example, the claw pole three-phase brushless motor 1 shown in FIGS. 1A and 1B may include three phases of coils. More specifically, the brushless motor 1 may include, between the U-phase core 11 and the V-phase core 15 (the first V-phase core 12), a U-phase coil (corresponding to the first coil C1) near the U-phase core 11 and a V-phase coil near the first V-phase core 12, and may include, between the V-phase core 15 (the second V-phase core 13) and the W-phase core 14, a V-phase coil near the second V-phase core 13 and a W-phase coil (corresponding to the second coil C2) near the W-phase core 14. The U-phase coil, the V-phase coil, and the W-phase coil may then be connected by delta connection to form the claw pole three-phase brushless motor.

When one of the three phases of coils of this motor is disconnected for one reason or another, the control circuit 80 detects the disconnected coil, and supplies currents of two phases having a phase difference of 60 degrees to the remaining two phases of coils via the three-phase inverter circuit 70. This enables the motor to generate a circular rotating magnetic field.

When one of the three phases of coils is disconnected for one reason or another, the motor 1 can still be driven as if it is a motor including only two of the three phases of coils. As a result, the motor 1 prevents a torque ripple from being generated in accordance with the electrical angle and prevents noise or vibration caused by such a torque ripple.

To detect a disconnected coil, current detectors may be arranged in one-to-one to the different phases of coils. Each current detector determines whether a current is flowing through the corresponding coil, and outputs information on the connection or disconnection to the control circuit 80. The control circuit 80 then determines which coil phase has been disconnected, and controls currents having a phase difference of 60 degrees to flow through the two phases of coils that are not disconnected.

Fourth Embodiment

A fourth embodiment of the present invention will now be described with reference to FIG. 14.

The motor of the third embodiment uses the first to third current detectors 76a, 76b, and 76c, and calculates the three-phase alternating currents IX, IY, and IZ flowing through the three hypothetic terminals based on the U-phase current IU, the V-phase current IV, and the W-phase current IW detected by the first to third current detectors 76a, 76b, and 76c.

In the fourth embodiment, the second current detector 76b for detecting the V-phase current IV is eliminated. The motor of the fourth embodiment uses only the first and third current detectors 76a and 76c.

For ease of explanation, the components in the fourth embodiment that are the same as the components in the third embodiment are given the same numerals as those components and will not be described in detail.

Figure 14:
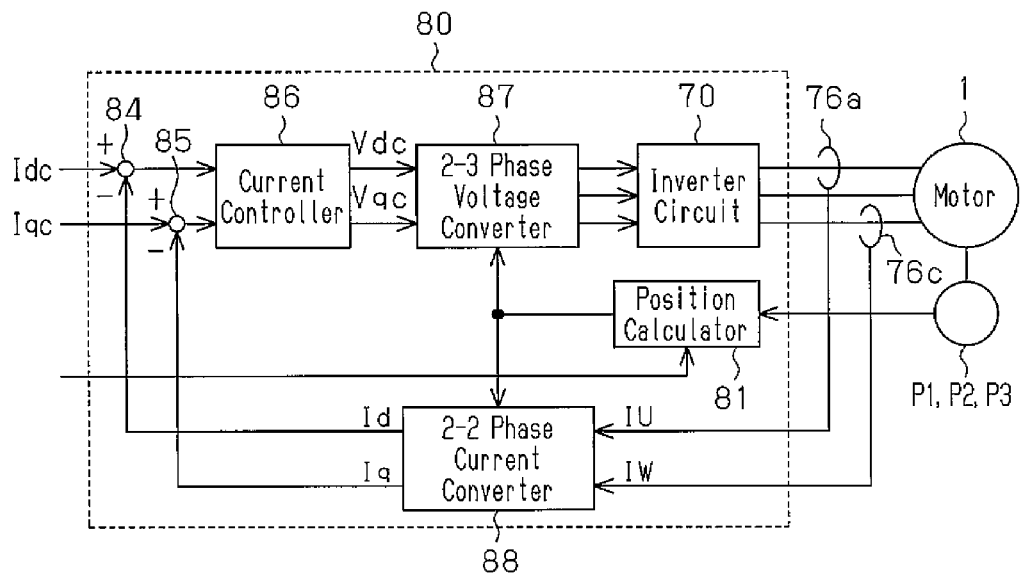
FIG. 14 is an electric block schematic showing an electric configuration according to a fourth embodiment of the present invention.

As shown in FIG. 14, the control circuit 80 of the fourth embodiment includes a two-two phase current converter 88, which integrates the two-three phase current converter 82 and the three-two phase current converter 83 used in the third embodiment. The two-two phase current converter 88 is connected to the first and third current detectors 76a and 76c. The two-two phase current converter 88 receives detected signals of the U-phase current IU and the W-phase current IW, and calculates the three-phase alternating currents IX, IY, and IZ flowing through the three hypothetic terminals based on the detected values of the U-phase current IU and the W-phase current IW using equations 6 to 8 below.

$$IX = IU - (IU + IW)/3 \qquad \text{Equation 6}$$

$$IY = -(IU + IW)/3 \qquad \text{Equation 7}$$

$$IZ = IW - (IU + IW)/3 \qquad \text{Equation 8}$$

The two-two phase current converter 88 substitutes the three-phase alternating currents IX, IY, and IZ calculated using equations 6 to 8 into equations 4 and 5 described above to calculate the d-axis actual current value Id and the q-axis actual current value Iq using equations 9 and 10 written using the U-phase current IU and the W-phase current IW.

$$Id = \sqrt{\frac{2}{3}} \left\{ IU \times \cos(\theta + \varnothing) + IW \times \cos\left(\theta + \varnothing + \frac{2}{3}\pi\right) \right\} \qquad \text{Equation 9}$$

$$Iq = -\sqrt{\frac{2}{3}} \left\{ IU \times \sin(\theta + \varnothing) + IW \times \sin\left(\theta + \varnothing + \frac{2}{3}\pi\right) \right\} \qquad \text{Equation 10}$$

The resulting values are the same as the values obtained when the three-phase alternating currents IX, IY, and IZ calculated using equations 1 to 3 are substituted into equations 4 and 5 above. In this manner, the d-axis actual current value Id and the q-axis actual current value Iq can be calculated without requiring the V-phase current IV to be detected.

The d-axis actual current value Id and the q-axis actual current value Iq can be directly calculated by substituting the values of the U-phase current IU and the W-phase current IW detected by the first to third current detectors 76a and 76c into equations 9 and 10, without converting these values to the three-phase alternating currents IX, IY, and IZ flowing through the three hypothetic terminals.

The two-two phase current converter 88 outputs the calculated d-axis actual current value Id to the d-axis subtractor 84 and the calculated q-axis actual current value Iq to the q-axis subtractor 85.

The processing performed thereafter is the same as described in the third embodiment. More specifically, the gate signals US1, VS1, WS1, US2, VS2, and WS2 are generated through the processing performed by the d-axis subtractor 84, the q-axis subtractor 85, the current controller 86, and the two-three phase voltage converter 87. The current vector control of the motor 1 is then executed.

The motor 1 having the above-described structure has the advantages described below.

(6) In the fourth embodiment, the d-axis actual current value Id and the q-axis actual current value Iq can be calculated using only the values of the U-phase current IU and the W-phase current IW.

As a result, the motor 1 can maintain the rotating magnetic field and can execute current vector control, without using the second current detector 76b to detect the V-phase current IV.

The elimination of the single current detector downsizes the claw pole three-phase brushless motor 1.

(7) The fourth embodiment is also applicable to a motor 1 having three phases of coils in the same manner as described in the third embodiment.

More specifically, when one of the three phases of coils included in the claw pole three-phase brushless motor 1 is disconnected for one reason or another, the motor can still generate a circular rotating magnetic field when two phases of currents having a phase difference of 60 degrees are supplied to the remaining two phases of coils. As a result, the motor prevents a torque ripple from being generated in accordance with the electrical angle and prevents noise or vibration of the motor 1 caused by such a torque ripple.

Fifth Embodiment

A fifth embodiment of the present invention will now be described with reference to FIG. 15.

The third and fourth embodiments describe the technique used when one of the three phases of coils connected by delta connection included in the claw pole three-phase brushless motor is disconnected.

The fifth embodiment relates to a technique for enabling a claw pole three-phase brushless motor to generate a rotating magnetic field when one of the three phases of coils connected by Y connection in the brushless motor is disconnected.

For ease of explanation, the components in the fifth embodiment that are the same as the components in the third embodiment are given the same numerals as those components and will not be described in detail.

To function as a claw pole three-phase brushless motor 91 including three phases of coils connected by Y connection, the motor 1 shown in FIGS. 1A and 1b may additionally include, between the U-phase core 11 and the V-phase core (the first V-phase core 12), a U-phase coil (corresponding to the first coil C1) near the U-phase core 11 and a V-phase coil near the first V-phase core 12, and also include, between the V-phase core 15 (the second V-phase core 13) and the W-phase core 14, a W-phase coil near the second V-phase core 13 and a W-phase coil (corresponding to the second coil C2) near the W-phase core 14. The U-phase coil, the V-phase coil, and the W-phase coil are connected by Y connection to form the claw pole three-phase brushless motor.

Figure 15:
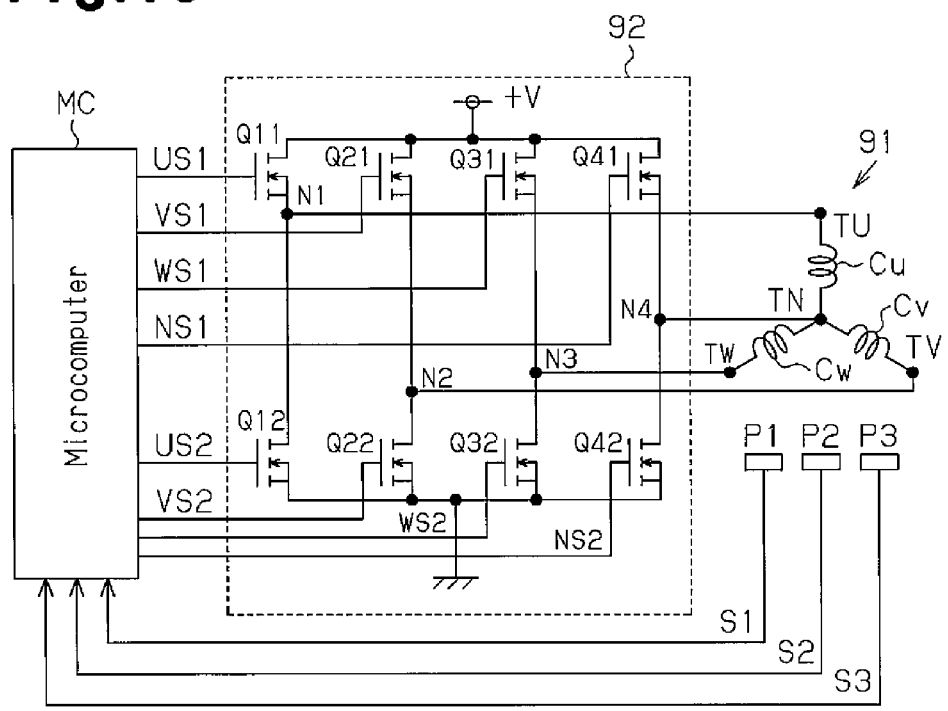
FIG. 15 is an electric block schematic showing an electric configuration according to a fifth embodiment of the present invention.

FIG. 15 shows a drive circuit for the motor 91. In FIG. 15, a U-phase coil Cu, a V-phase coil Cv, and a W-phase coil Cw are connected by Y connection. An N-terminal, which is a neutral point terminal connecting the U-phase coil Cu, the V-phase coil Cv, and the W-phase coil Cw, is connected to the three-phase inverter circuit 92. A U-terminal TU of the U-phase coil Cu, a V-terminal TV of the V-phase coil Cv, and a W-terminal TW of the W-phase coil Cw are also connected to the three-phase inverter circuit 92.

The three-phase inverter 92 additionally includes a series circuit including a fourth upper arm transistor Q41 and a fourth lower arm transistor Q42 connected to each other in series, in addition to the components of the three-phase inverter circuit 70 described in the first embodiment. The series circuit is connected in parallel to the other series circuits.

A connecting point (node N1) between the source of the first upper arm transistor Q11 and the drain of the first lower arm transistor Q12 is connected to the U-terminal TU. A connecting point (node N2) between the source of the second upper arm transistor Q21 and the drain of the second lower arm transistor Q22 is connected to the V-terminal TV. A connecting point (node N3) between the source of the third upper arm transistor Q31 and the drain of the third lower arm transistor Q32 is connected to the W-terminal TW. A connecting point (node N4) between the source of the fourth upper arm transistor Q41 and the drain of the fourth lower arm transistor Q42 is connected to the N-terminal TN.

A fourth upper gate signal NS1 is input to the gate terminal of the fourth upper arm transistor Q41. A fourth lower gate signal NS2 is input to the gate terminal of the fourth lower arm transistor Q42.

The gate terminals of the transistors Q11 to Q41 and Q12 to Q42 are connected to a microcomputer MC. The microcomputer MC outputs gate signals US1 to NS1 and US2 to NS2 to the gate terminals of the transistors Q11 to Q41 and Q12 to Q42 to control the motor 91 to rotate via the three-phase inverter circuit 92.

During normal operation, the microcomputer MC outputs the fourth upper gate signal NS1 constantly at an L level to the gate terminal of the fourth upper arm transistor Q41 and outputs the fourth lower gate signal NS2 constantly at an H level to the gate terminal of the fourth lower arm transistor Q42. During normal operation, the three-phase inverter circuit 92 keeps the N-terminal TN grounded.

The microcomputer MC inputs the gate signals US1, VS1, WS1, US2, VS2, and WS2 for turning on and off the arm transistors Q11, Q21, Q31, Q12, Q22, and Q32 into the gate terminals of the transistors Q11, Q21, Q31, Q12, Q22, and Q32. This causes voltages having a phase difference of 120 degrees at a known electrical angle to be applied to the U-phase coil Cu, the V-phase coil Cv, and the W-phase coil Cw.

This causes the stator to generate a circular rotating magnetic field, which rotates the motor 91.

When one of the U-phase coil Cu, the V-phase coil Cv, and the W-phase coil Cw, or specifically the V-phase coil Cv in this example, is disconnected for one reason or another, the microcomputer MC outputs the gate signals US1, VS1, WS1, NS1, US2, VS2, WS2, and NS2 in the manner described below.

The microcomputer MC detects that the V-phase coil Cv has been disconnected, and then generates the first upper gate signal US1, the third upper gate signal WS1, the fourth upper gate signal NS1, the first lower gate signal US2, the third lower gate signal WS2, and the fourth lower gate signal NS2, which are 180-degree square-wave signals. The microcomputer MC outputs the generated signals to the three-phase inverter circuit 92 at the timings shown in FIG. 16.

In detail, when the first upper gate signal US1 rises from an L level to an H level at an electrical angle of 0 degrees, the fourth upper gate signal NS1 falls from an H level to an L level at an electrical angle of 60 degrees, and the third upper gate signal WS1 rises from an L level to an H level at an electrical angle of 120 degrees.

When the first upper gate signal US1 falls from an H level to an L level at an electrical angle of 180 degrees, the fourth upper gate signal NS1 rises from an L level to an H level at an electrical angle of 240 degrees. The third upper gate signal WS1 falls from an H level to an L level at an electrical angle of 300 degrees.

As a result, voltages +V from the DC power supply are applied to the U-phase coil Cu and the W-phase coil Cw via the U-terminal TU, the V-terminal TV, and the W-terminal TW at the timings of the upper gate signals US1, NS1, and WS1.

Figure 16:
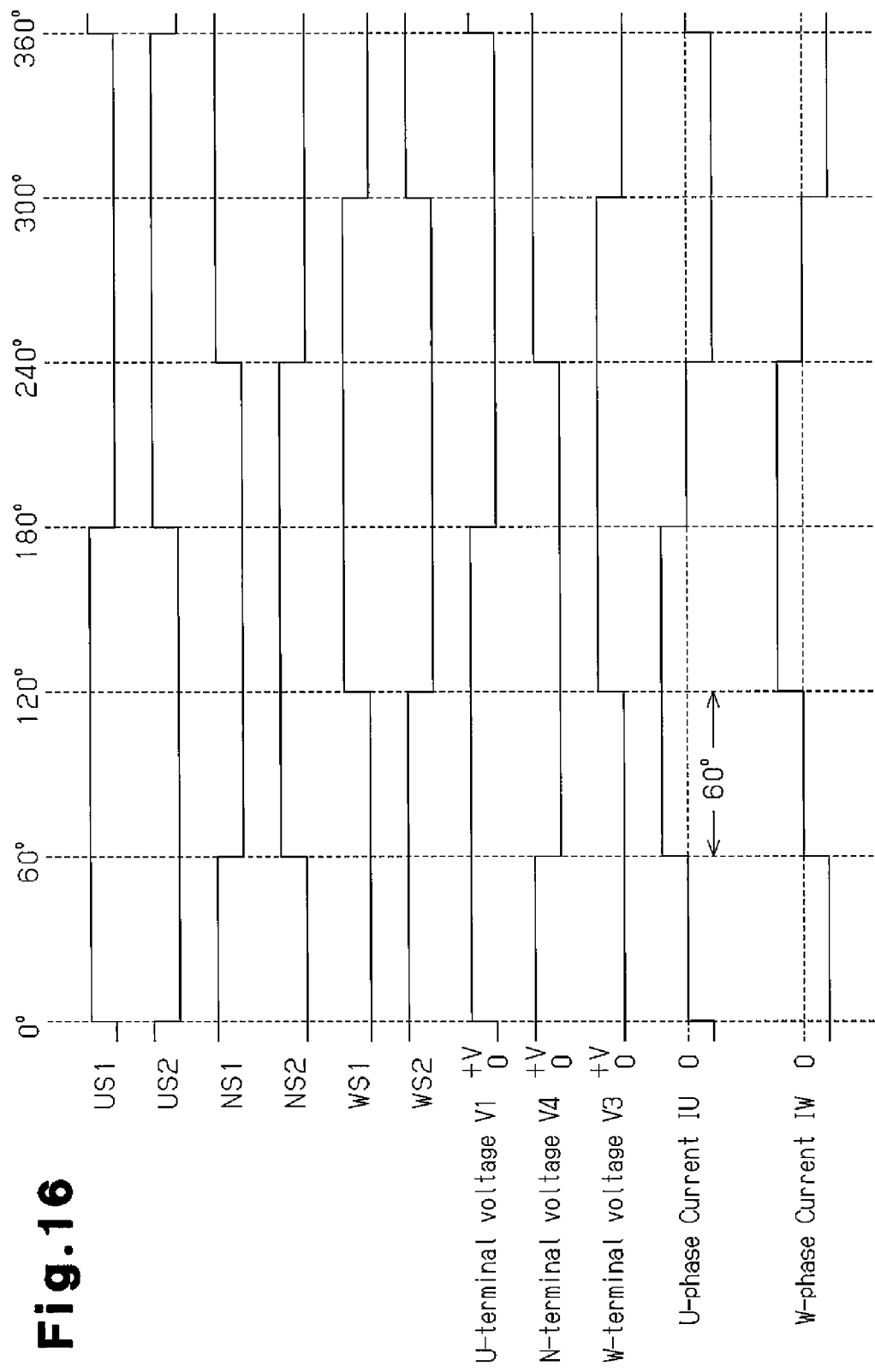
FIG. 16 is a waveform diagram showing gate signals output to the three-phase inverter circuit of FIG. 15.

The microcomputer MC then outputs the upper gate signals US1, WS1, and NS1 and the lower gate signals US2, WS2, and NS2 to the three-phase inverter circuit 92 at the timings shown in FIG. 16. This generates a rotating magnetic field, which rotates the motor 91 in which the V-phase coil Cv has been disconnected.

Generation of the rotating magnetic field will now be described with reference to FIG. 17.

[Electrical Angles of 0 to 60 Degrees]

During this period, the voltages +V from the DC power supply are applied to the U-terminal TU and the N-terminal TN as the U-terminal voltage V1 and the N-terminal voltage V4. In this state, the W-terminal TW is grounded. No coil current (no U-phase current IU) flows through the U-phase coil Cu. The coil current (the W-phase current IW) flows through the W-phase coil Cw from the N-terminal TN toward the W-terminal TW.

In this state, no current flows from the U-terminal TU to the W-terminal TW via the U-phase coil Cu, the N-terminal TN, and the W-phase coil Cw. A magnetic field formed by the W-phase current IW flowing through the W-phase coil Cw solely determines the magnitude and the rotational angle of the magnetic field generated by the motor. The resulting rotating magnetic field has a rotational angle of 30 degrees (bar W-phase).

[Electrical Angles of 60 to 120 Degrees]

During this period, the voltage +V from the DC power supply is applied to the U-terminal TU as the U-terminal voltage V1. In this state, the N-terminal TN and the W-terminal TW are grounded. The coil current (the U-phase current IU) flows through the U-phase coil Cu from the U-terminal TU toward the N-terminal TN. No coil current (no W-phase current IW) flows through the W-phase coil Cw.

In this state, no current flows from the U-terminal TU to the W-terminal TW via the U-phase coil Cu, the N-terminal TN, and the W-phase coil Cw. A magnetic field formed by the U-phase current IU flowing through the U-phase coil Cu solely determines the magnitude and the rotational angle of the magnetic field generated by the motor. The resulting rotating magnetic field has the same rotational angle as the rotating magnetic field generated at the electrical angles of 0 to 60 degrees, and has a rotational angle of 90 degrees (U-phase).

[Electrical Angles of 120 to 180 Degrees]

During this period, the voltages +V from the DC power supply are applied to the U-terminal TU and the W-terminal TW as the U-terminal voltage V1 and the W-terminal voltage V3. In this state, the N-terminal TN is grounded. The coil current (the U-phase current IU) flows through the U-phase coil Cu from the U-terminal TU toward the N-terminal TN. The coil current (the W-phase current IW) flows through the W-phase coil Cw from the W-terminal TW toward the N-terminal TN.

In this state, a synthetic magnetic field including a magnetic field formed by the U-phase current IU flowing through the U-phase coil Cu and a magnetic field formed by the W-phase current IW flowing through the W-phase coil Cw determines the rotational angle of the magnetic field generated by the motor. The resulting rotating magnetic field has the same rotational angle as the rotating magnetic field generated at the electrical angles of 0 to 60 degrees, and has a rotational angle of 150 degrees (bar V-phase).

[Electrical Angles of 180 to 240 Degrees]

During this period, the voltage +V from the DC power supply is applied to the W-terminal TW as the W-terminal voltage V3. In this state, the U-terminal TU and the N-terminal TN are grounded. No coil current (no U-phase current IU) flows through the U-phase coil Cu. The coil current (the W-phase current IW) flows through the W-phase coil Cw from the W-terminal TW toward the N-terminal TN.

In this state, no current flows from the W-terminal TW to the U-terminal TU via the W-phase coil Cw, the N-terminal TN, and the U-phase coil Cu. A magnetic field formed by the W-phase current IW flowing through the W-phase coil Cw solely determines the magnitude and the rotational angle of the magnetic field generated by the motor. The resulting rotating magnetic field has the same rotational angle as the rotating magnetic field generated at the electrical angles of 0 to 60 degrees, and has a rotational angle of 210 degrees (bar W-phase).

[Electrical Angles of 240 to 300 Degrees]

During this period, the voltages +V from the DC power supply are applied to the N-terminal TN and the W-terminal TW as the N-terminal voltage V4 and the W-terminal voltage V3. In this state, the U-terminal TU is grounded. The coil current (the U-phase current IU) flows through the U-phase coil Cu from the N-terminal TN toward the U-terminal TU. No coil current (no W-phase current IW) flows through the W-phase coil Cw.

In this state, no current flows from the W-terminal TW to the U-terminal TU via the W-phase coil Cw, the N-terminal TN, and the U-phase coil Cu. A magnetic field formed by the U-phase current IU flowing through the U-phase coil Cu solely determines the magnitude and the rotational angle of the magnetic field generated by the motor. The resulting rotating magnetic field has the same rotational angle as the rotating magnetic field generated at the electrical angles of 0 to 60 degrees, and has a rotational angle of 270 degrees (bar U-phase).

[Electrical Angles of 300 to 360 Degrees]

During this period, the voltage +V from the DC power supply is applied to the N-terminal TN as the N-terminal voltage V4. In this state, the U-terminal TU and the W-terminal TW are grounded. The coil current (the U-phase current IU) flows through the U-phase coil Cu from the N-terminal TN toward the U-terminal TU. The coil current (the W-phase current IW) flows through the W-phase coil Cw from the N-terminal TN toward the W-terminal TW.

In this state, a synthetic magnetic field including a magnetic field formed by the U-phase current IU flowing through the U-phase coil Cu and a magnetic field formed by the W-phase coil current IW flowing through the W-phase coil Cw determines the magnitude and the rotational angle of the magnetic field generated by the motor. The resulting rotating magnetic field has the same rotational angle as the rotating magnetic field generated at the electrical angles of 0 to 60 degrees, and has a rotational angle of 330 degrees (V-phase).

Figure 17:
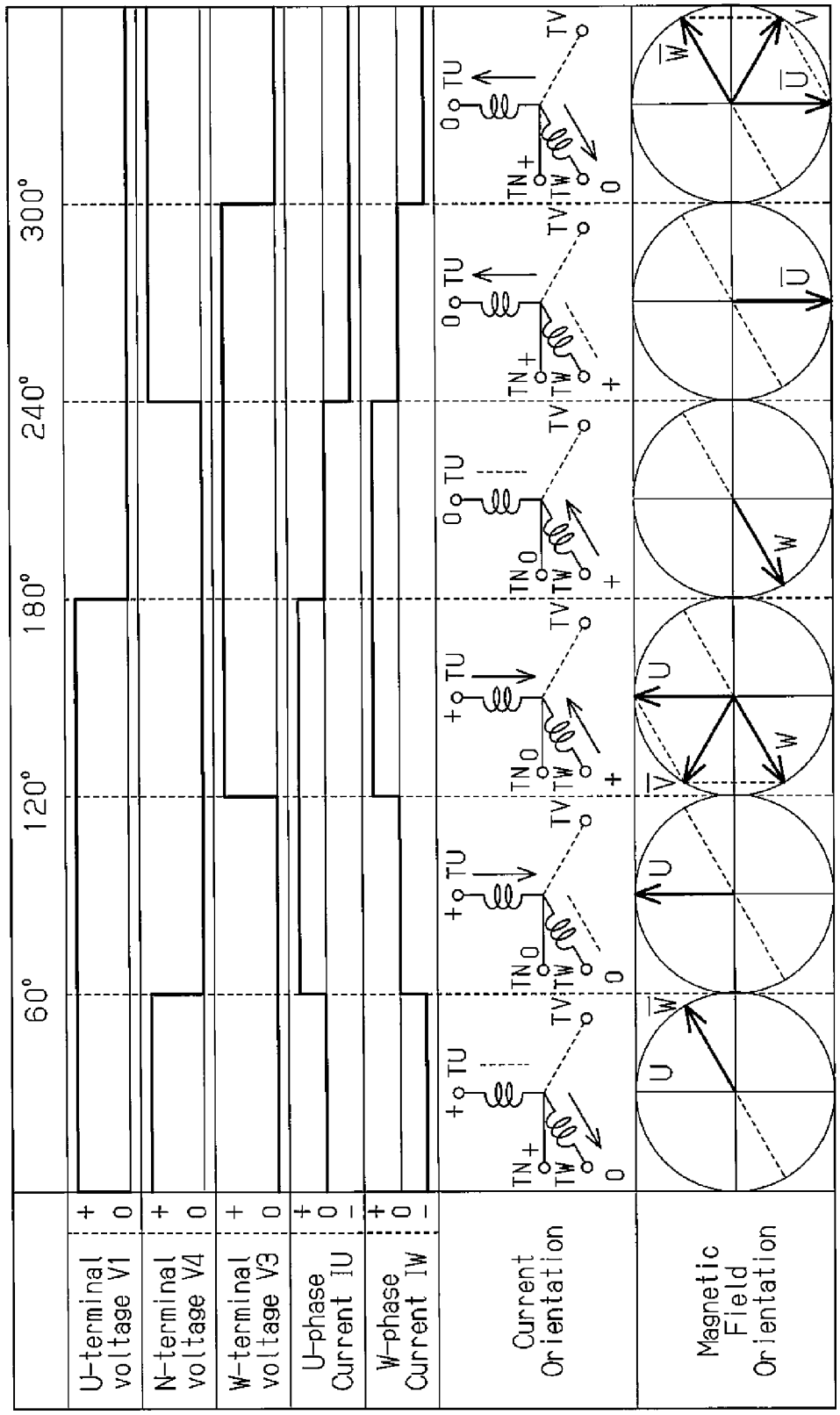
FIG. 17 is a diagram describing a rotating magnetic field generated in the motor of FIG. 15.

In this manner, the voltages +V from the DC power supply are applied to the terminals TU, TN, and TW of the coils Cu and Cw respectively as the U-terminal voltage V1, the N-terminal voltage V4, and the W-terminal voltage V3 at the predetermined timings as shown in FIG. 17. This causes the U-phase current IU and the W-phase current IW having a phase difference of 60 degrees to flow through the coils Cu and Cw. This enables the motor to generate a circular magnetic field. In other words, this enables the coils Cu and Cw to sequentially generate a unidirectional magnetic field at an interval of 60 degrees in the circumferential direction, and also enables the magnetic field with the same magnitude to be generated at any electrical angle position.

This enables the motor 91 in which the V-phase coil Cv is disconnected to rotate without a torque ripple generated in accordance with the electrical angle, and without noise and vibration caused by such a torque ripple.

Although the present embodiment describes the case in which the V-phase coil Cv is disconnected, the same control as described in the present embodiment enables the motor to rotate without a torque ripple and noise and vibration caused by such a torque ripple when the U-phase coil Cu or the W-phase coil Cw is disconnected.

The motor 91 having the above-described structure including three phases of coils has the advantages described below.

(8) In the fifth embodiment, the motor 91 including three phases of coils connected by Y connection can still generate a rotating magnetic field when one of the three phases of coils is disconnected, and can rotate without a torque ripple generated in accordance with the electrical angle and without noise and vibration caused by such a torque ripple.

In the fifth embodiment, the claw pole three-phase brushless motor 91 including three phases of coils connected by Y connection may execute the control described below when one of the three phases of coils is disconnected.

Figure 18:
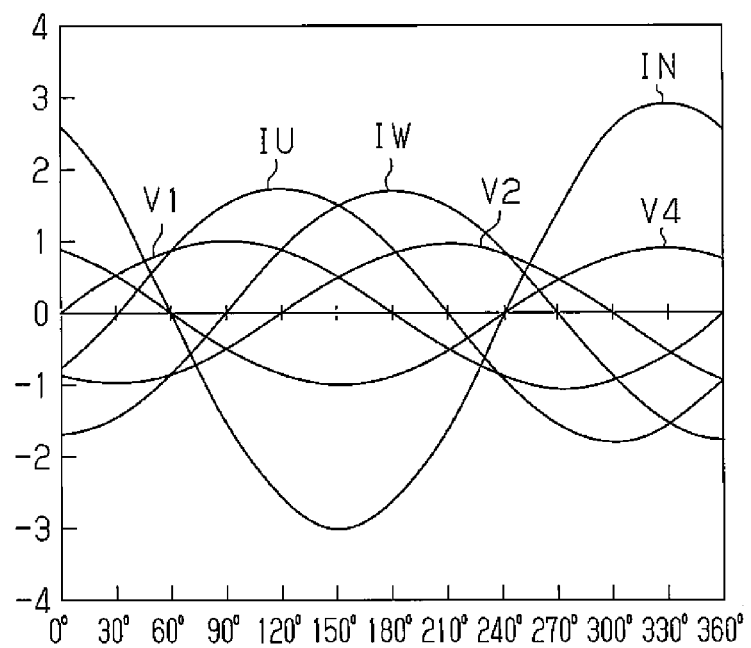
FIG. 18 is a waveform diagram showing sine wave voltages applied to a motor according a modification of the fifth embodiment.

As shown in FIG. 18, sine wave voltages (V1, V4, and V2) having a phase difference of 120 degrees may be applied to the U-terminal TU, the W-terminal TW, and the N-terminal TN, and sine wave currents (the U-phase current IU and the W-phase current IW) having a phase difference of 60 degrees may be supplied to the U-terminal TU and the W-terminal TW. Although the voltage utilization efficiency is low in this case, this control also enables the motor to generate a circular rotating magnetic field and generate a stable torque.

In the drawings, IN indicates a current flowing between the N-terminal TN and the node N4.

Figure 19:
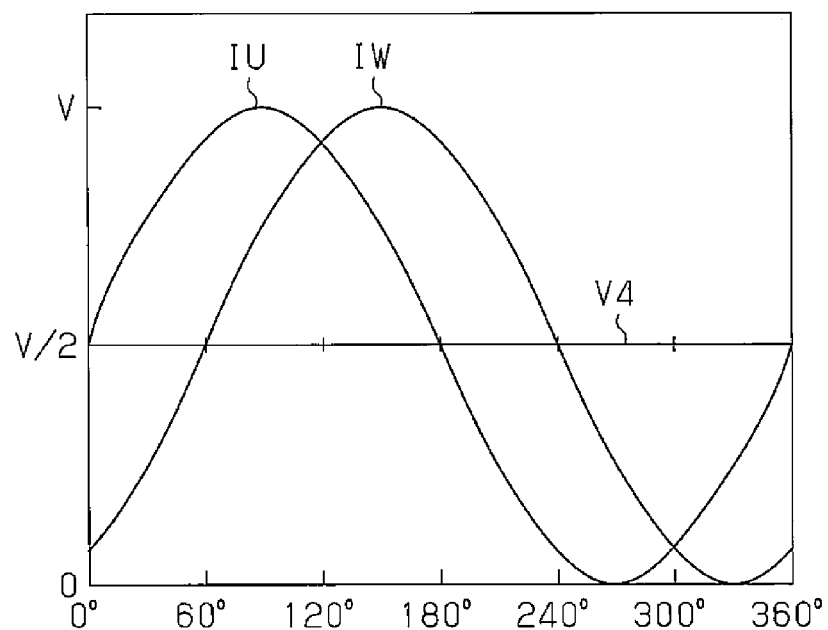
FIG. 19 is a waveform diagram showing sine wave voltages applied to a motor according to another modification of the fifth embodiment.
Figure 20:
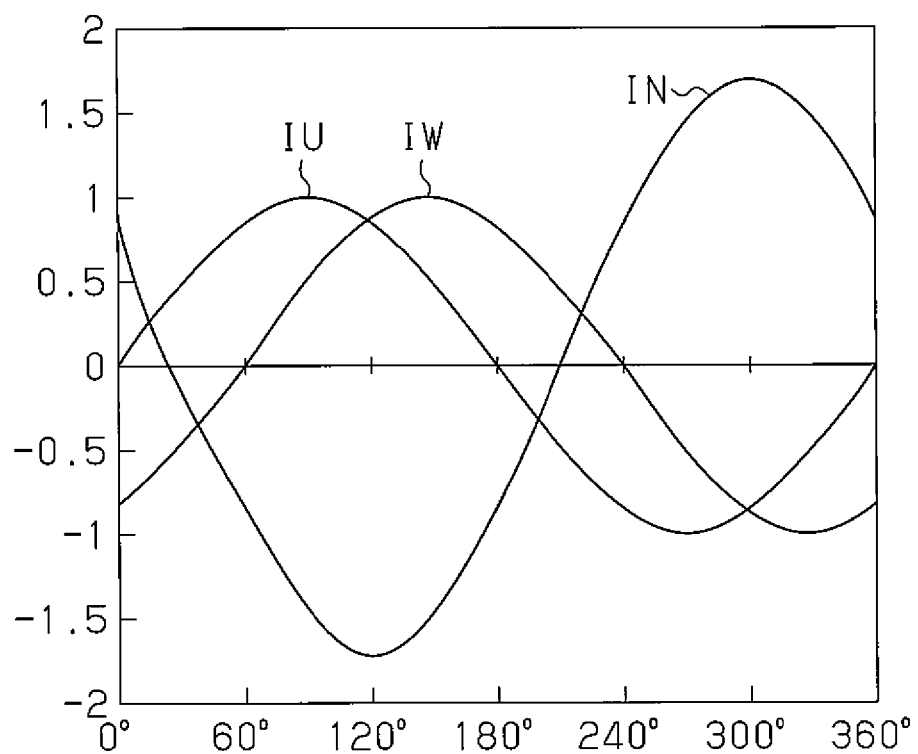
FIG. 20 is a waveform diagram showing sine wave currents flowing through the motor according to the modification of FIG. 19.

As shown in FIG. 19, a N-terminal voltage V4, which is half the voltage +V supplied from the DC power supply, may be applied to the N-terminal TN, and sine wave voltages having a phase difference of 60 degrees may be applied to the U-terminal TU and the W-terminal TW. As shown in FIG. 20, sine wave currents (the U-phase current IU and the W-phase current IW) having a phase difference of 60 degrees may be supplied to the U-terminal TU and the W-terminal TW. Although the voltage utilization efficiency is even lower in this case, this control also enables the motor to generate a circular rotating magnetic field and generate a stable torque.

Sixth Embodiment

A sixth embodiment of the present invention will now be described with reference to FIG. 21.

In the first to fifth embodiments, the first to third position sensors P1 to P3 included in the claw pole three-phase brushless motor detect the rotational position of the rotor 60, which is then used to determine the timings at which the voltages +V from the DC power supply are supplied to the U-terminal TU, V-terminal TV, and W-terminal TW.

The sixth embodiment relates to a brushless motor having a sensorless structure, that is, a brushless motor that detects the rotational position of the rotor 60 without using the first to third position sensors P1 to P3.

For ease of explanation, the components in the sixth embodiment that are the same as the components in the first embodiment are given the same numerals as those components and will not be described in detail.

Figure 21:
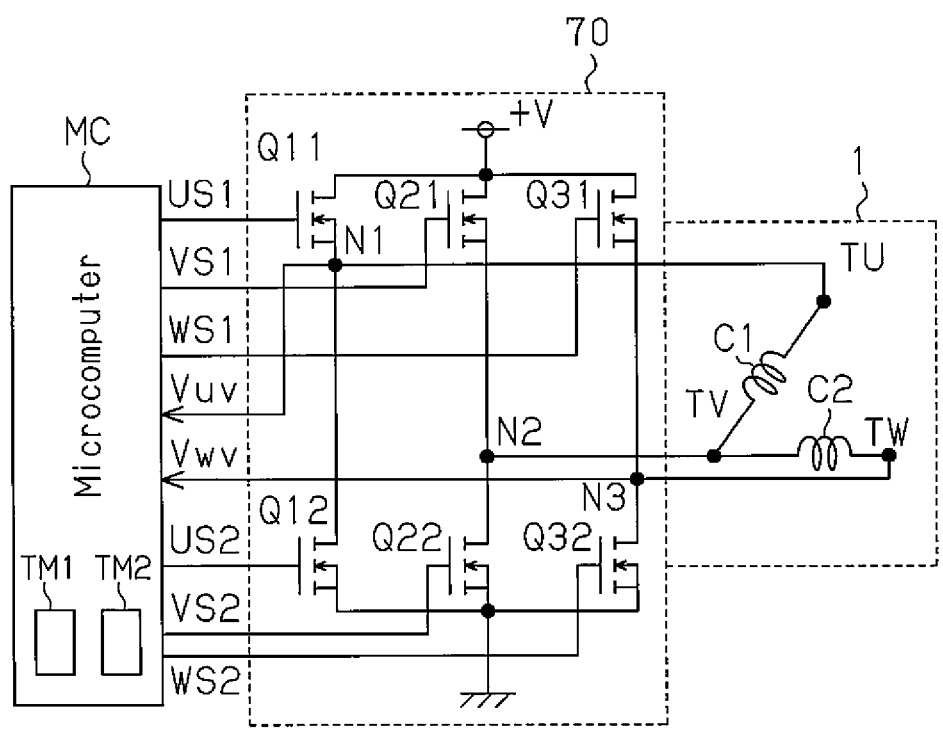
FIG. 21 is an electric schematic showing a motor according to a sixth embodiment of the present invention.

In FIG. 21, the stator of the motor 1 includes two (a first coil C1 and a second coil C2) of three phases of coils connected by delta connection, in which the two phases of coils are connected in series, in the same manner as the motor described in the first embodiment. The motor 1 of the sixth embodiment eliminates the first to third position sensors P1 to P3.

The first coil C1 and the second coil C2 are connected to a three-phase inverter circuit 70 including a three-phase bridge circuit.

The U-terminal TU of the first coil C1 is connected to the connecting point (the node N1) between the source of the first upper arm transistor Q11 and the drain of the first lower arm transistor Q12.

The V-terminal TV connecting the first coil C1 and the second coil C2 is connected to the connecting point (the node N2) between the source of the second upper arm transistor Q21 and the drain of the second lower arm transistor Q22. The W-terminal TW of the second coil C2 is connected to the connecting point (the node N3) between the source of the third upper arm transistor Q31 and the drain of the third lower arm transistor Q32.

The gate terminals of the transistors Q11, Q21, Q31, Q12, Q22, and Q32 are connected to a microcomputer MC including a potential difference detection circuit and an estimation circuit. The microcomputer MC outputs gate signals US1, VS1, WS1, US2, VS2, and WS2 to the gate terminals of the transistors Q11, Q21, Q31, Q12, Q22, and Q32 to control the motor 1 to rotate via the three-phase inverter circuit 70.

In the same manner as in the first embodiment, the microcomputer MC applies 180-degree square wave voltages having a phase difference of 120 degrees to the U-terminal TU, the V-terminal TV, and the W-terminal TW of the brushless motor 1. As a result, the first coil current I1 and the second coil current I2 having a phase difference corresponding to an electrical angle of 60 degrees flow through the first coil C1 and the second coil C2.

The microcomputer MC is connected to the node N1 of the three-phase inverter circuit 70, and detects a potential difference Vuv between the two terminals of the first coil C1. The microcomputer MC is also connected to the node N3, and detects a potential difference Vwv between the two terminals of the second coil C2. The microcomputer MC calculates the rotational position of the rotor 60 based on the detected potential differences Vuv and Vwv.

When rotating the motor 1, the microcomputer MC detects the rotational position of the rotor 60 during a period in which the U-terminal voltage V1 and the V-terminal voltage V2 are at the same potential and a period in which the W-terminal V3 and the V-terminal voltage V2 are at the same potential.

The U-terminal voltage V1 and the V-terminal voltage V2 are at the same potential in the period corresponding to the electrical angles of 0 to 60 degrees and also in the period corresponding to the electrical angles of 180 to 240 degrees. The W-terminal voltage V3 and the V-terminal voltage V2 are at the same potential in the period corresponding to the electrical angles of 60 to 120 degrees and also in the period corresponding to the electrical angles of 240 to 300 degrees.

The microcomputer MC detects the rotational position (the electrical angle of 60 degrees and of 240 degrees) of the rotor 60 by releasing the U-terminal TU during the period in which the U-terminal voltage V1 and the V-terminal voltage V2 are at the same potential.

The microcomputer MC detects the rotational position (the electrical angle of 120 degrees and of 300 degrees) of the rotor 60 by releasing the W-terminal TW during the period in which the W-terminal voltage V3 and the V-terminal voltage V2 are at the same potential.

Figure 22:
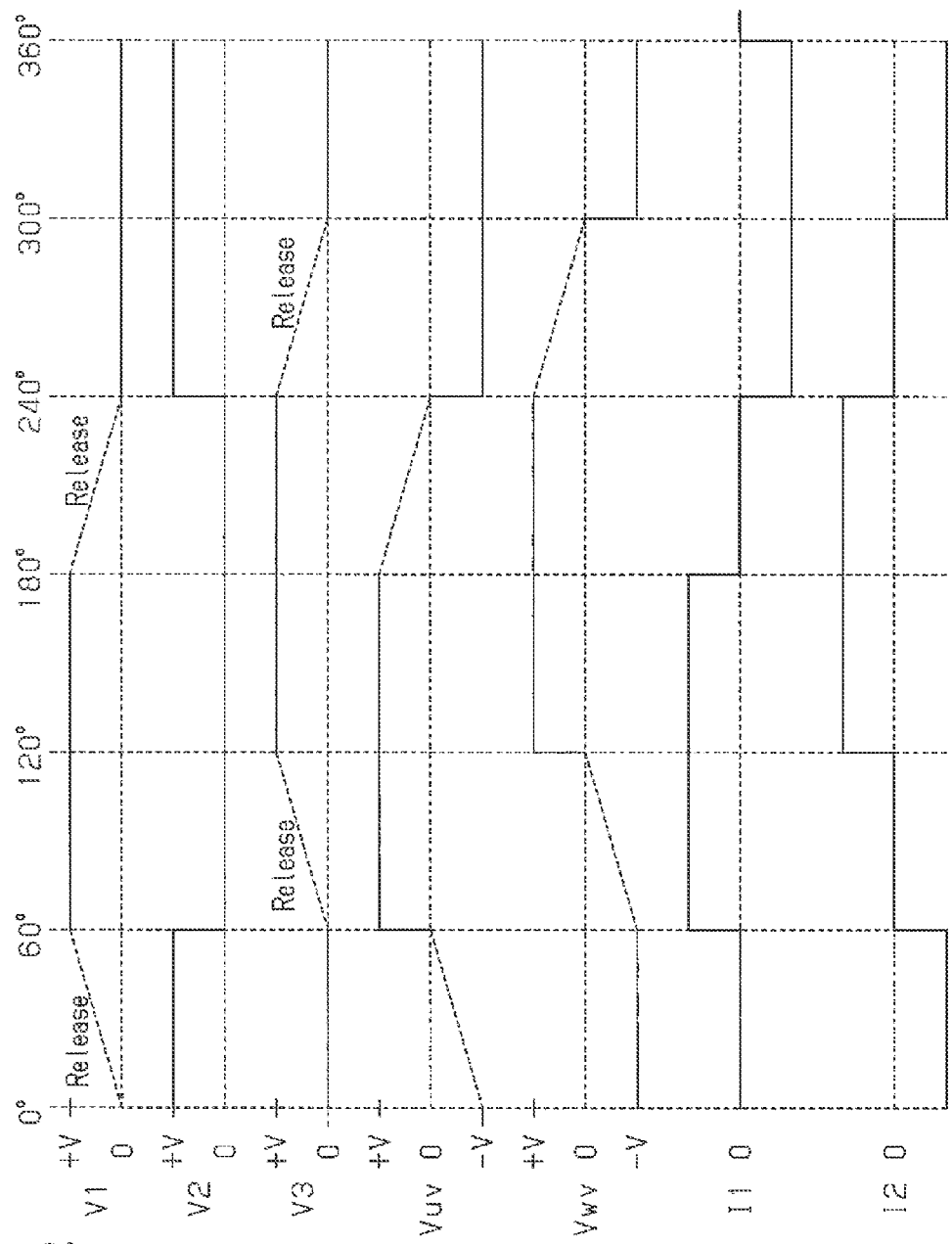
FIG. 22 is a diagram describing detection of the rotational position of the motor of FIG. 21.

The method for detecting the rotational position will now be described with reference to FIG. 22.

[Electrical Angles of 0 to 60 Degrees]

When entering this period, the voltage +V from the DC power supply is applied to the U-terminal TU and causes the U-terminal TU and the V-terminal TV to have the same potential as the voltage +V. In this state, the W-terminal TW is grounded. During this period, the microcomputer MC releases the U-terminal TU. More specifically, the microcomputer MC turns off the first upper arm transistor Q11 to release the U-terminal TU.

The releasing of the U-terminal TU causes an inductive voltage to be generated. The inductive voltage causes the U-terminal voltage V1 at the U-terminal TU to increase gradually toward the voltage +V. The inductive voltage causes the U-terminal voltage V1, that is, the potential difference Vuv (=−V) between the two terminals of the first coil C1, to be input to the microcomputer MC via the node N1. In this case, no first coil current I1 flows through the first coil C1.

The potential difference Vuv caused by the generated inductive voltage converges to 0 volt when the rotor 60 rotates to an electrical angle of 60 degrees.

When detecting that the potential difference Vuv reaches 0 volt, the microcomputer MC determines that the rotor 60 is at the rotational position corresponding to the electrical angle of 60 degrees. The microcomputer MC then applies the voltage +V from the DC power supply to the U-terminal TU as the U-terminal voltage V1 to execute control required for the electrical angles of 60 to 120 degrees. This causes the V-terminal TV and the W-terminal TW to be grounded.

[Electrical Angles of 60 to 120 Degrees]

During this period, the V-terminal TV is grounded so that the V-terminal TV has the same potential as the W-terminal TW, which has been grounded, and the U-terminal voltage V1 is at the voltage +V. During this period, the microcomputer MC releases the W-terminal TW. More specifically, the microcomputer MC turns off the third upper arm transistor Q31 to release the W-terminal TW.

Releasing the W-terminal TW causes an inductive voltage to be generated. The inductive voltage causes the W-terminal voltage V3 at the W-terminal TW to increase gradually toward the voltage +V. The inductive voltage causes the W-terminal voltage V3, that is, the potential difference Vwv (=−V) between the two terminals of the second coil C2, to be input to the microcomputer MC via the node N3. In this case, no second coil current I2 flows through the second coil C2.

The potential difference Vwv caused by generation of the inductive voltage converges to 0 volt when the rotor 60 rotates to an electrical angle of 120 degrees.

When detecting that the potential difference Vwv reaches 0 volt, the microcomputer MC determines that the rotor 60 is at the rotational position corresponding to the electrical angle of 120 degrees. The microcomputer MC then applies the voltage +V from the DC power supply to the W-terminal TW as the W-terminal voltage V3 to execute control required for the electrical angles of 120 to 180 degrees.

[Electrical Angles of 180 to 240 Degrees]

During this period, the U-terminal TU is grounded so that the U-terminal TU has the same potential as the V-terminal TV, which has been grounded, and the voltage +V from the DC power supply is applied to the W-terminal TW. During this period, the microcomputer MC releases the U-terminal TU. More specifically, the microcomputer MC turns off the first upper arm transistor Q11 to release the U-terminal TU.

The releasing of the U-terminal TU causes an inductive voltage to be generated. The inductive voltage causes the U-terminal voltage V1 at the U-terminal TU to decrease gradually toward 0 volt. The inductive voltage causes the U-terminal voltage V1, that is, the potential difference Vuv (=+V) between the two terminals of the first coil C1, to be input to the microcomputer MC via the node N1. In this case, no first coil current I1 flows through the first coil C1.

The potential difference Vuv converges to 0 volt when the rotor 60 rotates to an electrical angle of 240 degrees.

When detecting that the potential difference Vuv reaches 0 volt, the microcomputer MC determines that the rotor 60 is at the rotational position corresponding to the electrical angle of 240 degrees. The microcomputer MC then applies the voltage +V from the DC power supply to the V-terminal TV as the V-terminal voltage V2 to execute control required for the electrical angles of 240 to 300 degrees.

[Electrical Angles of 240 to 300 Degrees]

During this period, the voltage +V from the DC power supply is applied to the V-terminal TV so that the W-terminal TW and the V-terminal TV have the same potential, and the U-terminal TU is grounded. During this period, the microcomputer MC releases the W-terminal TW. More specifically, the microcomputer MC turns off the third upper arm transistor Q31 to release the W-terminal TW.

The releasing of the W-terminal TW causes an inductive voltage to be generated. The inductive voltage causes the W-terminal voltage V3 at the W-terminal TW to decrease gradually toward 0 volt. The inductive voltage causes the W-terminal voltage V3, that is, the potential difference Vwv (=+V) between the two terminals of the second coil C2, to be input to the microcomputer MC via the node N3. In this case, no second coil current I2 flows through the second coil C2.

The potential difference Vwv converges to 0 volt when the rotor 60 rotates to an electrical angle of 300 degrees.

When detecting that the potential difference Vwv between the two terminals of the second coil C2 reaches 0 volt, the microcomputer MC determines that the rotor 60 is at the rotational position corresponding to the electrical angle of 300 degrees. The microcomputer MC then causes the W-terminal TW to be grounded to execute control required for the electrical angles of 300 to 0 degrees.

The method described above fails to detect the rotational position of the rotor 60 corresponding to the electrical angle of 180 degrees and of 360 degrees (0 degree). The microcomputer MC uses a first timer TM1 and a second timer TM2, which function as internal timer circuits of the microcomputer MC, and estimates the rotational position of the rotor 60 corresponding to the electrical angle of 180 degrees and of 360 degrees.

[Detecting the Rotational Position of the Rotor 60 Corresponding to the Electrical Angle of 180 Degrees]

At the electrical angles of 0 to 60 degrees, the microcomputer MC detects the rotational position of the rotor 60 corresponding to the electrical angle of 60 degrees, and then activates the internal first timer TM1.

At the electrical angles of 60 to 120 degrees, the microcomputer MC detects the rotational position of the rotor 60 corresponding to the electrical angle of 120 degrees, and then activates the internal second timer TM2 and stops the first timer TM1. The microcomputer MC then obtains the time required by the rotor 60 to rotate from the electrical angle of 60 degrees to the electrical angle of 120 degrees.

When the elapsed time measured by the second timer TM2 reaches the required time previously obtained using the first timer TM1, the microcomputer MC determines that the rotor 60 is at the rotational position corresponding to the electrical angle of 180 degrees.

[Detecting the Rotational Position of the Rotor 60 Corresponding to the Electrical Angle of 360 Degrees]

At the electrical angles of 180 to 240 degrees, the microcomputer MC detects the rotational position of the rotor 60 corresponding to the electrical angle of 240 degrees, and then activates the internal first timer TM1.

At the electrical angles of 240 to 300 degrees, the microcomputer MC detects the rotational position of the rotor 60 corresponding to the electrical angle of 300 degrees, and then activates the internal second timer TM2 and stops the first timer TM1. The microcomputer MC then obtains the time required by the rotor 60 to rotate from the electrical angle of 240 degrees to the electrical angle of 300 degrees.

When the elapsed time measured by the second timer TM2 reaches the required time previously obtained using the first timer TM1, the microcomputer MC determines that the rotor 60 is at the rotational position corresponding to the electrical angle of 360 degrees.

The claw pole three-phase brushless motor 1 having the above-described structure including three phases of coils connected by Y connection has the advantages described below.

(1) In the sixth embodiment, the claw pole three-phase brushless motor 1 including two (the first coil C1 and the second coil C2) of three phases of coils can detect the rotational position of the rotor 60 without using the first to third position sensors P1, P2, and P3.

This downsizes the motor further, and enables the motor to be used in severe environments such as under high temperatures.

The invention claimed is:

1. A method for driving a brushless motor including a first coil and a second coil for two phases, wherein the motor does not include a coil for one of three phases, the method comprising:
    connecting a three-phase inverter circuit to the first coil and the second coil; and
    applying currents having a phase difference corresponding to an electrical angle of 60 degrees to the first coil and the second coil to generate a circular rotating magnetic field, wherein:
        the brushless motor is a claw pole three-phase brushless motor, and
        the first coil and the second coil are formed by eliminating one of the coils for three phases that are delta-connected, and
    wherein the method further comprises applying 180-degree square wave voltages having a phase difference of 120 degrees to a common terminal that connects one end of the first coil and one end of the second coil, a first terminal of the first coil that is the other end of the first coil, and a second terminal of the second coil that is the other end of the second coil so that currents flow through the first coil and the second coil at a phase difference corresponding to an electrical angle of 60 degrees.

2. The brushless motor driving method according to claim 1, further comprising applying sine wave voltages having a phase difference of 120 degrees to a common terminal that connects one end of the first coil and one end of the second coil, a first terminal of the first coil that is the other end of the first coil, and a second terminal of the second coil that is the other end of the second coil so that currents flow through the first coil and the second coil at a phase difference corresponding to an electrical angle of 60 degrees.

3. The brushless motor driving method according to claim 2, further comprising:
    constantly applying, to the common terminal, a sine wave voltage at a level that is one half the maximum value of the sine wave voltages applied to the first terminal and the second terminal; and
    applying sine wave voltages having a phase difference corresponding to an electrical angle of 60 degrees to the first terminal and the second terminal so that two phases of currents having a phase difference corresponding to an electrical angle of 60 degrees flow through the first coil and the second coil.

4. The brushless motor driving method according to claim 1, further comprising:
    calculating alternating currents for three phases respectively flowing through three hypothetic terminals when the brushless motor that does not include a coil is converted to an equivalence of a three-phase brushless motor;
    calculating, from the alternating currents for three phases, a d-axis actual current value and a q-axis actual current value in a two-axis rotation coordinate system that rotates in synchronization with frequencies of terminal voltages applied to the first coil and the second coil;
    calculating a deviation between the d-axis actual current value and a d-axis current command value and a deviation between the q-axis actual current value and a q-axis current command value;
    calculating a d-axis voltage command value and a q-axis voltage command value from the two deviations so that currents flow in accordance with the d-axis current command value and the q-axis current command value; and
    applying voltages to the common terminal, first terminal, and second terminal in accordance with the d-axis voltage command value and the q-axis voltage command value so that currents of two phases having a phase difference corresponding to an electrical angle of 60 degrees flow through the first coil and the second coil.

5. The brushless motor driving method according to claim 4, further comprising:
    detecting a first-phase current flowing through a first terminal that is one end of the first coil, a second-phase current flowing through a second terminal that is one end of the second coil, and a third-phase current flowing through a common terminal connecting the other end of the first coil and the other end of the second coil; and
    calculating the alternating currents for three phases respectively flowing through the three hypothetic terminals based on the first-phase current, the second-phase current, and the third-phase current.

6. The brushless motor driving method according to claim 4, further comprising:
    detecting, when a common terminal connects one end of the first coil and one end of the second coil, a first-phase current flowing through a first terminal of the first coil that is the other end of the first coil and a second-phase current flowing through a second terminal of the second coil that is the other end of the second coil; and
    calculating the alternating currents for three phases respectively flowing through the three hypothetic terminals based on the first-phase current and the second-phase current.

7. A method for driving a brushless motor in which three phases of coils are connected to a three-phase inverter circuit and supplied with three phases of equilibrium currents, the method comprising:
    when one of the three phases of coils is disconnected so that two phases of coils are connected to the three-phase inverter circuit and supplied with currents, applying currents of two phases having a phase difference corresponding to an electrical angle of 60 degrees to the remaining two phases of coils through the three-phase inverter circuit to generate a circular rotating magnetic field, wherein the brushless motor is a three-phase brushless motor in which the three phases of coils are in a delta connection or Y connection, and
    wherein the method further comprises applying, when one of the three phases of coils in the delta connection is disconnected, 180-degree wave voltages having a phase difference of 120 degrees to three terminals of the three phases of coils so that currents having a phase difference corresponding to an electrical angle of 60 degrees flow to the remaining two phases of coils.

8. The brushless motor driving method according to claim 7, further comprising:
applying, when one of the three phases of coils in the delta connection is disconnected, sine wave voltages having a phase difference of 120 degrees to a common terminal connecting the two phases of coils that are not disconnected, a terminal connecting the disconnected coil and one of the two phases of coils that are not disconnected, and a terminal connecting the disconnected coil and the other one of the two phases of coils that are not disconnected so that current having a phase difference corresponding to an electrical angle of 60 degrees flows through the two phases of coils that are not disconnected.

9. The brushless motor driving method according to claim 8, further comprising:
constantly applying, to the common terminal, a sine wave voltage at a level that is one half the maximum value of the sine wave voltages applied to the remaining two terminals when one of the three phases of coils in the delta connection is disconnected; and
applying sine wave voltages having a phase difference corresponding to an electrical angle of 60 degrees to the remaining two terminals so that currents having a phase difference corresponding to an electrical angle of 60 degrees flow through the coils that are not disconnected.

10. The brushless motor driving method according to claim 7, wherein the brushless motor is a three-phase brushless motor including three phases of coils in a delta connection, the method further comprising:
calculating alternating currents for three phases respectively flowing through three terminals of the three phases of coils when one of the three phases of coils in the delta connection is disconnected;
obtaining, from the alternating currents for three phases, a d-axis actual current value and a q-axis actual current value in a two-axis rotation coordinate system that rotates in synchronization with frequencies of terminal voltages applied to a first coil and a second coil that are not disconnected;
obtaining a deviation between the d-axis actual current value and a d-axis current command value and a deviation between the q-axis actual current value and a q-axis current command value;
calculating a d-axis voltage command value and a q-axis voltage command value from the two deviations so that currents flow in accordance with the d-axis current command value and the q-axis current command value; and
applying voltages to the first coil and the second coil based on the d-axis voltage command value and the q-axis voltage command value so that two phases of currents having a phase difference corresponding to an electrical angle of 60 degrees flow.

11. The brushless motor driving method according to claim 10, further comprising:
detecting a first-phase current flowing through a first terminal that is one end of the first coil, a second-phase current flowing through a second terminal that is one end of the second coil, and a third-phase current flowing through a common terminal connecting the other end of the first coil and the other end of the second coil; and
calculating the alternating currents for three phases respectively flowing through the three terminals of the three phases of coils based on the first-phase current, the second-phase current, and the third-phase current.

12. The brushless motor driving method according to claim 10, further comprising:
detecting, when a common terminal connects one end of the first coil and one end of the second coil, a first-phase current flowing through a first terminal that is the other end of the first coil and a second-phase current flowing through a second terminal that is the other end of the second coil; and calculating, based on the first-phase current and the second-phase current, the alternating currents for three phases respectively flowing through three hypothetic terminals when the brushless motor in which a coil for one phase is disconnected is converted to an equivalence of a three-phase brushless motor in which a coil for one phase is not disconnected.

13. The brushless motor driving method according to claim 7, further comprising:
applying, when one of the three phases of coils in the Y connection is disconnected, 180-degree square-wave voltages having a phase difference of 120 degrees to a neutral point terminal and to terminals of the two phases of coils that are not disconnected so that currents having a phase difference corresponding to an electrical angle of 60 degrees flow through the coils that are not disconnected.

14. The brushless motor driving method according to claim 7, further comprising:
applying, when one of the three phases of coils in the Y connection is disconnected, sine wave voltages having a phase difference of 120 degrees to a neutral point terminal and to terminals of the two phases of coils that are not disconnected so that currents having a phase difference corresponding to an electrical angle of 60 degrees flow through the coils that are not disconnected.

15. The brushless motor driving method according to claim 14, further comprising:
constantly applying to the neutral point terminal, when one of the three phases of coils in the Y connection is disconnected, a sine wave voltage at a level that is one half the maximum value of the sine wave voltages applied to the terminals of the two phases of coils that are not disconnected; and
applying sine wave voltages having a phase difference corresponding to an electrical angle of 60 degrees to the two phases of coils that are not disconnected so that currents having a phase difference corresponding to an electrical angle of 60 degrees flow through the terminals of the two phases of coils that are not disconnected.

16. The brushless motor driving method according to claim 7, wherein the brushless motor is a three-phase brushless motor including three phases of coils in the Y connection, the method further comprising:
calculating, when one of the three phases of coils in the Y connection is disconnected, alternating currents for three phases respectively flowing through a neutral point terminal and terminals of the two phases of coils that are not disconnected;
obtaining, from the alternating currents for three phases, a d-axis actual current value and a q-axis actual current value in a two-axis rotation coordinate system that rotates in synchronization with frequencies of terminal voltages applied to the two phases of coils that are not disconnected;

obtaining a deviation between the d-axis actual current value and a d-axis current command value and a deviation between the q-axis actual current value and a q-axis current command value;

calculating, from the two deviations, a d-axis voltage command value and a q-axis voltage command value so that currents flow in accordance with the d-axis current voltage command and the q-axis current command value;

and applying voltages to the terminals of the two phases of coils that are not disconnected in accordance with the d-axis voltage command value and the q-axis voltage command value so that currents having a phase difference corresponding to an electrical angle of 60 degrees flow to the two phases of coils that are not disconnected.

17. The brushless motor driving method according to claim 16, further comprising:

detecting a first-phase current, a second-phase current, and a third-phase current flowing respectively through the neutral point terminal and the terminals of the two phases of coils that are not disconnected; and calculating the alternating currents for three phases respectively flowing through each of the terminals based on the first-phase current, the second-phase current, and the third-phase current.

18. The brushless motor driving method according to claim 16, further comprising:

detecting a first-phase current flowing through a terminal of one of the two phases of coils that are not disconnected and a second-phase current flowing through a terminal of the other one of the two phases of coils that are not disconnected; and calculating alternating currents for three phases respectively flowing through three hypothetic terminals when the brushless motor in which a coil for one phase is disconnected is converted to an equivalence of a three-phase brushless motor including no disconnected coils based on the first-phase current and the second-phase current.

19. A circuit for driving a brushless motor including a first coil and a second coil for two phases, wherein the motor does not include a coil for one of three phases, the circuit comprising:

a three-phase inverter circuit connected to a common terminal connecting one end of the first coil and one end of the second coil, a first terminal that is the other end of the first coil, and a second terminal that is the other end of the second coil, wherein the three-phase inverter circuit connects the common terminal, the first terminal, and the second terminal with a phase difference of 120 degrees to a positive terminal of a direct current power supply during a period corresponding to 180 degrees and continuously or intermittently connects the common terminal, the first terminal, and the second terminal with a phase difference of 120 degrees to a negative terminal of the direct current power supply during a period corresponding to the remaining 180 degrees to energize the first coil and the second coil and supply currents having a phase difference corresponding to an electrical angle of 60 degrees to the first coil and the second coil; and a control circuit that generates a control signal for controlling the three-phase inverter circuit and outputs the control signal to the three-phase inverter circuit.

20. A method for detecting a rotational position of a brushless motor including a first coil and a second coil for two phases, wherein the motor does not include a coil for one of three phases, the method comprising:

connecting a three-phase inverter circuit to a common terminal connecting one end of the first coil and one end of the second coil, a first terminal that is the other end of the first coil, and a second terminal that is the other end of the second coil;

connecting the common terminal, the first terminal, and the second terminal with a phase difference of 120 degrees to a positive terminal of a direct current power supply during a period corresponding to 180 degrees and continuously or intermittently connecting the common terminal, the first terminal, and the second terminal with a phase difference of 120 degrees to a negative terminal of the direct current power supply during a period corresponding to the remaining 180 degrees to energize the common terminal, the first terminal and the second terminal and to supply currents having a phase difference corresponding to an electrical angle of 60 degrees to the first coil and the second coil; releasing, during a period in which the coils are energized so that a potential at one of the first terminal and the second terminal is the same as the common terminal, the one of the first terminal and the second terminal that has the same potential as the common terminal; and estimating an electrical angle based on a change in the potential at the released terminal.

21. The method for detecting a rotational position of a brushless motor according to claim 20, further comprising:

estimating, during a period in which the coils are energized so that potentials at the first terminal and the second terminal differ from that at the common terminal, the electrical angle based on an energizing timing estimated in another period in which the coils are energized.

22. A circuit for detecting a rotational position of a brushless motor including a first coil and a second coil for two phases, wherein the brushless motor does not include a coil for one of three phases, and the brushless motor includes a common terminal connecting one end of the first coil and one end of the second coil, a first terminal that is the other end of the first coil, a second terminal that is the other end of the second coil, and a three-phase inverter circuit connected to the common terminal, the first terminal, and the second terminal, and the three-phase inverter circuit connects the common terminal, the first terminal, and the second terminal with a phase difference of 120 degrees to a positive terminal of a direct current power supply during a period corresponding to 180 degrees and continuously or intermittently connects the common terminal, the first terminal, and the second terminal with a phase difference of 120 degrees to a negative terminal of the direct current power supply during a period corresponding to the remaining 180 degrees to energize the common terminal, the first terminal and the second terminal and to supply currents having a phase difference corresponding to an electrical angle of 60 degrees to the first coil and the second coil, the circuit comprising:

a control circuit that outputs a control signal to the three-phase inverter circuit, during a period in which the coils are energized so that a potential at one of the first terminal and the second terminal is the same as the common terminal, the control circuit outputs a control signal for releasing to the three-phase inverter circuit so as to release the one of the first terminal and the second terminal that has the same potential as the common terminal;

a potential difference detection circuit that detects a potential difference between the first terminal and the common terminal or a potential difference between the second terminal and the common terminal when the first terminal or the second terminal is released; and an estimation circuit that estimates an electrical angle when the potential difference detected by the potential difference detection circuit reaches a predetermined potential difference.

23. The circuit for detecting a rotational position of a brushless motor according to claim 22, further comprising:

a timer circuit that measures time from when the first terminal or the second terminal is released to when the potential difference detection circuit detects the predetermined potential difference, wherein the estimation circuit estimates the electrical angle of the rotor based on the time measured by the timer circuit during a period in which the coils are energized with the potentials at the first terminal and the second terminal differing from that at the common terminal.

* * * * *